(12) United States Patent
Lackritz et al.

(10) Patent No.: US 6,236,774 B1
(45) Date of Patent: May 22, 2001

(54) OPTOELECTRONIC AND PHOTONIC DEVICES FORMED OF MATERIALS WHICH INHIBIT DEGRADATION AND FAILURE

(75) Inventors: Hilary Sue Lackritz, Cupertino; Tony C. Kowalczyk, Palo Alto; Yeong-Cheng Lee, Santa Clara; David A. G. Deacon, Los Altos, all of CA (US)

(73) Assignee: Gemfire Corporation, Palo Alto, CA (US)

( * ) Notice: Subject to any disclaimer, the term of this patent is extended or adjusted under 35 U.S.C. 154(b) by 0 days.

(21) Appl. No.: 09/274,271

(22) Filed: Mar. 22, 1999

(51) Int. Cl.$^7$ ....................................................... G02B 6/10
(52) U.S. Cl. .................................. 385/14; 385/8; 385/10; 385/37; 385/147; 385/131; 385/132; 385/16; 385/122; 428/913
(58) Field of Search .................................. 385/122, 1, 4, 385/37, 8, 16, 141, 45, 142, 143, 144, 145, 129, 132, 131, 14; 428/913

(56) References Cited

U.S. PATENT DOCUMENTS 6,047,098 * 4/2000 Sagawa et al. ...................... 385/141

OTHER PUBLICATIONS

Diemeer et al; "Polymeric Optical Waveguide Swithch Using the Thermooptic Effect"; Journal Of Light Technology, vol. 7, No. 3; pp. 449–453, Mar. 1989.*
R.T. Chen et al., "Optoelectronic Interconnects and Packaging IV," Proceedings of SPIE, vol. 3005 (1997) pp 238–251.
L.A. Hornak, ed., Marcel Dekker 1992 pp 459–460, Polymers For Lightwave And Integrated Optics.
Chapter 10, pp. 311–312, McKenna, G.B., *Comprehensive Polymer Science*, Pergamon Press, Oxford (1989).*
Matsuura et al., "Heat–resistant singlemode optical waveguides using fluorinated polyimides," *Electronics Letters*, 29(24):2107–2109 (Nov. 25, 1993)*
Mooseburger, R. et al., "A novel polymer digital optical switch with high temperature stability," Proc. 21$^{st}$ Eur. Conf. Opt. Comm. (ECOC'95)–Brussels, pp. 1063–1066 (1995).*
Wu, C. et al., "Electrooptic Cardo–Type Polymers with High Glass–Transition Temperatures," *Polymers for Second–Order Nonlinear Optics*, American Chemical Society Symposium Series 601, pp. 356–367 (1995).*
Olsen, M.C. et al., "Propagation Properties in Short Lengths of Rectangular Epoxy Waveguides," *IEEE Photonics Technology Letters*, 4(2):145–148 (Feb. 1992).*

(List continued on next page.)

*Primary Examiner*—Hung N. Ngo
(74) *Attorney, Agent, or Firm*—Townsend and Townsend and Crew LLP; Kenneth R. Allen

(57) ABSTRACT

Optoelectronic and photonic devices are formed by employing polymer materials that have a lower glass transition temperature (Tg) than the nominal operating temperature. By using such materials, the local or segmental mobility is increased so that local stress is eliminated or minimized on the polymer material, making performance more robust. The current invention involves use of a polymer in an optical device in an operating temperature range in the region above Tg, where the polymer segments between crosslinks are allowed local freedom of movement; however, large-scale movement of the material may be restricted by the crosslinked structure of the polymer material. The temperature operation point of a device constructed according to the invention is thus preferably distanced from both the viscoelastic region near Tg and from the glassy region below Tg; such that the device is operated in a region where viscoelastic effects do not significantly affect the materials system, and time-dependent responses of the polymer are minimized or eliminated. Device operation can thus achieve minimum degradation and show improved performance attributes.

70 Claims, 8 Drawing Sheets

OTHER PUBLICATIONS

Weidman, T.W. et al., "Synthesis and Applications of Polysilyne Thin Film Optical Waveguide Media," *Polymers for Lightwave and Integrated Optics*. Chapter 7, pp. 195–205 (1992).*

Kaino. T., "Polymer Optical Fibers," *Polymers for Lightwave and Integrated Optics*, Chapter 1, pp. 1–38 (1992).*

Nahata, A. et al., "Thermally stable polyester polymers for second-order nonlinear optics," *Appl. Phys. Lett.*, 64(25):3371–3373 (Jun. 20, 1994).*

Usui, M. et al., "Low–Loss Passive Polymer Optical Waveguides with High Environmental Stability," *J. Lightwave Technology*, 14(10):2338–2343 (Oct. 1996).*

Watanabe, T. et al., "Polymeric Optical Waveguide Circuits Formed Using Silicone Resin," *J. Lightwave Technology*, 16(6):1049–1055 (Jun. 1998).*

Mohlmann, G.R. et al., "Optically nonlinear polymeric devices," *SPIE Nonlinear Optical Properties of Organic Materials IV*, 1560:426–433 (1991).*

Osswald and Menges, *Materials Science of Polymers for Engineers.*, Hanser Publishers, cover and copyright page only (1996).*

Hutchinson, J.M. "Physical Aging of Polymers," *Prog. Polym. Sci.*, 20:703–760 (1995).*

Moshrefzadeh, R.S. et al., "Temperature of Dependence of Index of Refraction of Polymeric Waveguides," *J. Lightwave Technology*, 10(4):420–425 (Apr. 1992).*

* cited by examiner

OPTOELECTRONIC AND PHOTONIC DEVICES FORMED OF MATERIALS WHICH INHIBIT DEGRADATION AND FAILURE

STATEMENT AS TO RIGHTS TO INVENTIONS MADE UNDER FEDERALLY SPONSORED RESEARCH AND DEVELOPMENT

This invention was made with Government support under contract DASG60-96-C0149 awarded by U.S. Army Space and Missile Defense Command. The Government has certain rights in the invention.

BACKGROUND OF THE INVENTION

This invention relates to optical or photonic components, more particularly to optoelectronic devices formed of polymers.

Integrated optical devices (i.e., waveguides, switches, interconnects, and the like) are known which are constructed of polymer materials having a glass transition temperature (Tg) much higher than the operating temperature range of the device. The glass transition temperature is a range of temperatures over which significant local motion of the polymer backbone occurs. The Tg is usually defined as cooperative motion of about 10 backbone units, or a viscosity of $10^{14}$ poise, or a second order phase transition in heat capacity. The temperature at which the change in slope occurs in the rate of change of volume with temperature is considered the glass transition temperature (Tg), or softening point. For a detailed description of viscoelasticity and characteristics illustrated by FIGS. 1 and 2, see G. B. McKenna, chapter 10, *Comprehensive Polymer Science*, Volume 2, Edited by C. Booth and C. Price, Permagon Press, Oxford (1989).

Crosslinked materials manifest a glass transition when the molecular weight between crosslinks is significant enough to allow cooperative motion of the backbone units. Thus, a lightly crosslinked material will show a glass transition; while a highly crosslinked one may not.

Below Tg, polymeric material is prevented from reaching equilibrium because of the limited amount of segmental motion. Thermodynamic (entropic) effects still drive change towards equilibrium, but if the temperature is far enough below Tg, those changes will occur at such a slow rate that it does not appear experimentally during the time scale of interest (in this case the time scale of observation).

There are several reasons why materials having a high Tg have been chosen in the past, including compatibility with electronics processing and packaging, maintenance of orientation of chromophores incorporated within the material, and environmental robustness and performance stability. The use of high Tg materials (materials with a Tg higher than the operating temperature of the materials in a packaged device) ensures device operation in a region in which the local motion of the polymer segments is significantly restricted, and that the material operates in a glassy state. It was assumed in the earliest development of polymer films for optoelectronic devices that use of high Tg materials was a requirement. "For example, many of the first research EO polymers, whether guest-host or side chain, are based on thermo-plastic acrylate chemistry and exhibit glass transition temperatures~100–150° C. This low Tg results in high polymer chain diffusion rates and a variation of at least 10% in the optical properties of the poled state over 5 years of operation at ambient temperature. This rapid change is the natural consequence of the dynamic processes by which glassy polymers, operating close to Tg, undergo physical aging and relaxation to reduce stress and minimize free volume. When higher operating temperatures are considered (125° C.), the stability of the optical properties becomes even worse." (extracted from the review paper by R. Lytel et al., in *Polymers for Lightwave and Integrated Optics*, L. A. Hornak, ed., Marcel Dekker 1992 pp. 460).

Higher glass transition materials developed for integrated optoelectronics include polyimide materials (glass transitions ranging from about 250° C. to well over 350° C.) developed by Hoechst, DuPont, Amoco, and others, and polyquinolines (Tgs greater than 250° C.) developed by Hitachi Chemical. The researchers were guided by the presumption that "The first priority for such waveguides should be high thermal stability to provide compatibility with high-performance electronics device fabrication. The fluorinated polyimides have a high glass transition temperature above 335° C., and are thermally stable against the temperatures in IC fabrication processes involving soldering (~270° C.)." (T. Matsuura et al., *Elect. Lett.* 29 2107–2108 (1993)).

The requirements for polymers used in thermo-optic switches are reported by R. Moosburger et al. (*Proc. 21st Eur. Conf. On Opt. Comm.* (ECOC95-Brussels) p. 1063–1066). "Low loss switches at a wavelength of 1.3 $\mu$m were fabricated with the commercially available and high temperature stable (Tg>350° C.) polymer CYCLOTENE™ ... CYCLOTENE™ was chosen due to its low intrinsic optical loss, thermal stability in excess of 350° C., low moisture uptake and excellent planarisation properties."

The requirements for polymers for polymer passive optical interconnects are reported by DuPont for their Polyguide™ material system in R. T. Chen et al., SPIE Vol. 3005 (1997) p. 238–251, "High Tg and low coefficient of thermal expansion (CTE) polymers provide thermal-mechanical and environmental robustness and performance stability through their complete domination of the Polyguide™ packaged structure properties." DuPont uses cellulose acetate butyrate (CAB) materials as described in U.S. Pat. Nos. 5,292,620 and 5,098,804.

In addition to the acrylate, polyimide, polyquinoline, benzocyclobutene and CAB materials systems mentioned above, other materials systems that have been used to make integrated optical devices include cardo-polymers (C. Wu et al., in *Polymer for Second-Order Nonlinear Optics*, ACS Symposium Series 601, pp. 356–367, 1995), epoxy composites, (C. Olsen, et al., IEEE *Phot. Tech. Lett.* 4, pp. 145–148, 1992), polyalkylsilyne and polysilyne (T. Weidman et al., in *Polymers for Lightwave and Integrated Optics*, Op. Cit. pp. 195–205, 1992), polycarbonate and polystyrene (T. Kaino, in *Polymers for Lightwave and Integrated Optics*, Op. Cit., pp. 1–38, 1992), polyester (A. Nahata et al.,*Appl. Phys. Lett.* 64, 3371, 1994), polysiloxane (M. Usui et al., *J. Lightwave Technol.* 14 2338, 1996), and silicone (T. Watanabe et al. *J. Lightwave Technol.* 16 1049–1055, 1998). Poly methyl methacrylate, polystyrene, and polycarbonate have also been used for polymer optical fibers (POFs). Polycarbonate is used as compact disc substrates, and is used in plastic eyeglass lenses, hard contact lenses, and related applications. Silicones are used in flexible contact lenses.

Several researchers have designed optical switching devices using thermal effects in polymers. In addition to the research work of R. Moosburger, *Op. Cit.*, one group has been trying to commercialize thermo-optic switches using a digital optical waveguide switch configuration (G. R. Mohlmann et al., SPIE Vol. 1560 *Nonlinear Optical Properties of*

*Organic Materials IV,* pp. 426–433, 1991). In this work, a resistive heating element is deposited on a high glass transition temperature thermo-optic polymer stack that contains a waveguide y-branch splitter. Activation of a heater electrode produces a decrease in the refractive index under the activated electrode and results in light switching into the waveguide branch that is not activated.

In work with polymers for thermo-optic integrated optical devices leading to the present invention, it has been observed that there are nonlinear responses due to the viscoelastic behavior of the materials. After repetitive switching of a thermo-optic device, for instance, the polymers begin to exhibit a local change in index of refraction where they were heated, disturbing the "off" state of the switch and its time response. The viscoelastic properties of a polymer determine the mechanical character of the material response to applied heat or other perturbation. These properties control the rate at which applied changes (such as heat, stress, acoustic excitation, etc.) produce time-dependent responses in the material properties (such as evolution of the index of refraction, mechanical strain, etc.). Any truly elastic contribution generally is linear and disappears after the applied change is removed. However, time-dependent elements of the material response are retained within the material after the removal of the applied change and may require minutes to eons for restoration. If the material response results in a degradation of the operating characteristics of a device, that degradation may accumulate over time and result in failure of the device to meet performance specifications.

For optical devices used in communications, such behavior is undesirable because it can degrade the insertion loss, crosstalk immunity and other performance measures that are critical to the bit error rate of the system. Any such factor that changes with time is a problem for telecommunications applications, where reliability and reproducibility are essential, but where a broad range of environmental conditions may be encountered during a service lifetime. To enable effective thermo-optic switching devices, materials should not exhibit any such slow changes in optical properties.

SUMMARY OF THE INVENTION

According to the present invention optoelectronic and photonic devices are formed by employing polymer materials that have a lower glass transition temperature (Tg) than the nominal operating temperature. By using such materials, the local or segmental mobility is increased so that local stress is eliminated or minimized on the polymer material, making performance more robust.

The current invention involves use of a polymer in an optical device in an operating temperature range in the region above Tg, where the polymer segments between crosslinks are allowed local freedom of movement; however, large-scale movement of the material may be restricted by the crosslinked structure of the polymer material. The temperature operation point of a device constructed according to the invention is thus preferably distanced from both the viscoelastic region near Tg and from the glassy region below Tg; such that the device is operated in a region where viscoelastic effects do not significantly affect the materials system, and time-dependent responses of the polymer are minimized or eliminated. Device operation can thus achieve minimum degradation and show improved performance attributes.

This invention will be better understood upon reference to the following detailed description in connection with the accompanying drawings.

DESCRIPTION OF THE SPECIFIC EMBODIMENTS

Figure 1:
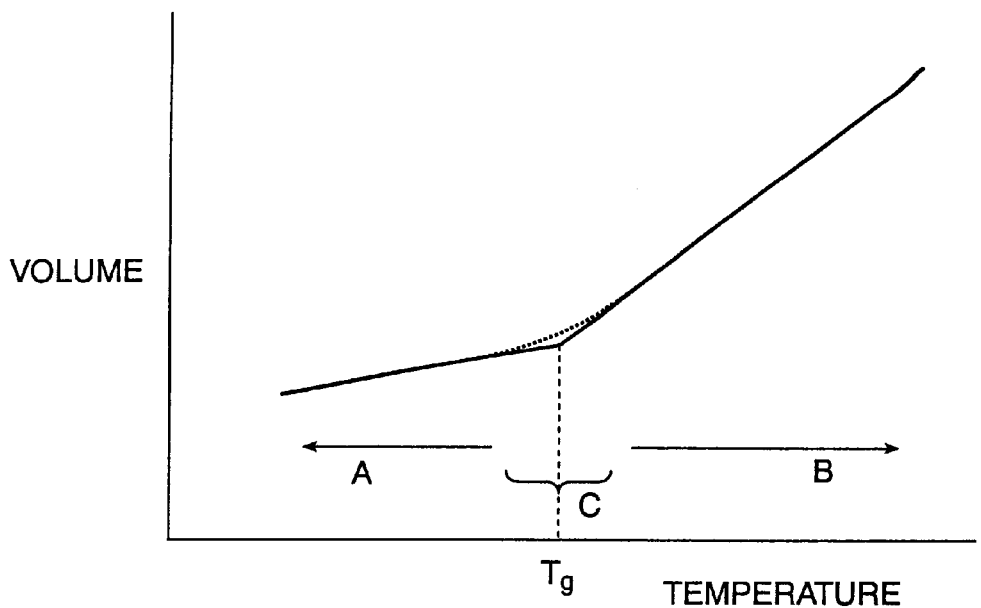
FIG. 1 is a graph illustrating schematically a change in volume as a function of temperature for an amorphous polymer material.

FIG. 1 illustrates schematically the change in volume as a function of temperature for an amorphous polymer material in general. Range A is the glassy range, range B is the rubbery (for a crosslinked material) or melt (non-crosslinked polymer) regime, and range C between range A and range B is the viscoelastic regime.

According to the present invention, the region above the glass transition temperature (region B in FIG. 1) in the volume-temperature curve is utilized. In this region, the polymer segments are allowed local freedom of movement. Consequently, repetitive operation enables devices to function with minimal or negligible viscoelastic effects contributing to premature failure/degradation of performance. In the preferred embodiment, large-scale (bulk) movement is restricted by the polymer material's crosslinked structure.

The motivation for operating in the region above the glass transition temperature (Tg) is to avoid the negative effects such as induced insertion loss associated with operating in the viscoelastic regime (described above). However, in applications such as integrated optics, localized heating must often be applied to microscopic regions to accomplish switching and other functions. Heating of the materials, even if the net temperature rise does not exceed Tg, has been found to cause long-lived changes in material properties such as index of refraction. These changes become quite pronounced after many cycles of applied heat pulses such as in an optical switch, for example. If the heating is localized, the changes in refractive index are localized, producing undesired optical effects such as increased insertion loss in devices.

According to the invention, a new class of optical devices is disclosed with physical properties qualitatively different from that previously known wherein polymeric optical materials are employed which are characterized by a relationship between the Tg and the range of intended operating temperatures, and specifically wherein the operating temperatures are near or above the Tg of the optical materials. By operating devices near or above the Tg of the optical materials, viscoelastic contributions may be diminished or even removed. If the operating temperature is near (slightly below or at) Tg, the viscoelastic problems may be reduced, and if the operating temperature is above Tg, there should be no accumulation of degradative effects due to viscoelastic contributions. This new type of device can also show improved performance and allow a wider range of operation.

Figure 2:
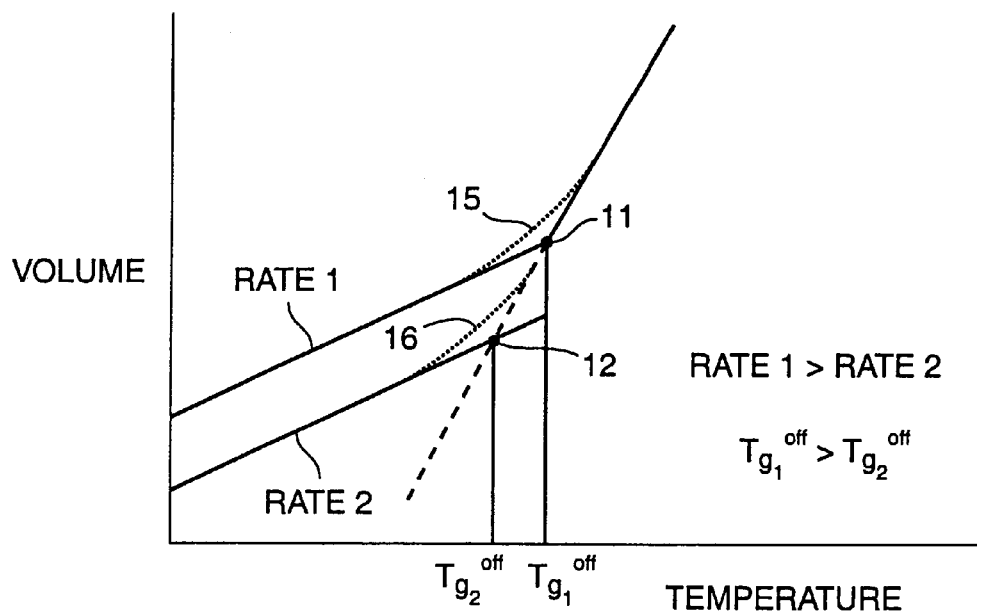
FIG. 2 is a graph illustrating schematically the concept of an effective glass transition temperature, where the value of Tg is a function of the rate of the measurement.
Figure 3:
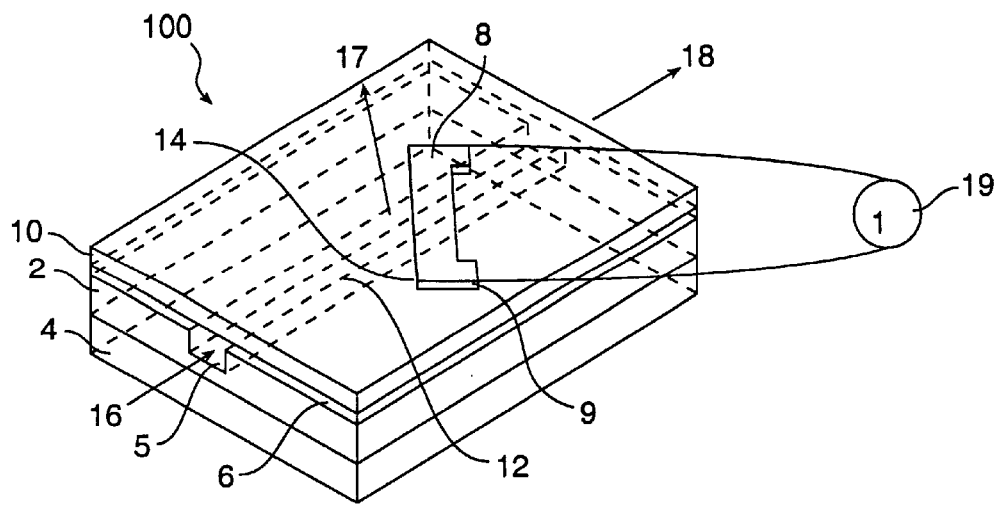
FIG. 3 is a perspective view of a Total Internal Reflection (TIR) switch in accordance with the present invention.

In experiments to measure the glass transition temperature Tg, and the material properties related to Tg as a function of temperature, it has been observed that the rate of change of the temperature during the measurement changes the result. A Tg measured with a slow temperature ramp (Rate 2) is lower than a Tg measured with a fast ramp (Rate 1), as is illustrated in FIG. 2. The rate dependent Tg is sometimes called the effective Tg. For these purposes, Tg shall be assumed to be the value which is measured at a rate of 10° C. per minute in a typical commercial DSC (differential scanning calorimetry) machine. However, the heating rate at which a thermo-optic switch of FIG. 3 is operated is much faster than 10° C. per minute. The Tg that applies to the operation of the device is the effective Tg at the rate of operation of the device.

In FIG. 2, the concept of a rate dependent Tg is illustrated. Examine first the top curve. The effective glass transition temperature, $T_g^{eff}$, is defined as the temperature at the intersection 11, 13 of the slopes of the volume-temperature curve. In a real material (non-ideal) the break is not sharp, as is indicated by the dotted lines 15, 17. The place at which the break is observed is a function of rate of change of the temperature; the curve of Rate 1 representing a faster heating or cooling rate; thus the break, or $T_{g1}^{eff}$, occurs at a higher temperature (i.e. if Rate 1>Rate 2, $T_{g1}^{eff} > T_{g2}^{eff}$). It is a well-established rule of thumb (see, for example, *Materials Science of Polymers for Engineers* by T. A. Osswald and G. Menges, Hanser Publishers, Munich 1995) that the glass transition temperature changes by roughly 3° C. for every order of magnitude change in the rate of the temperature change (McKenna, 1989; or *Viscoelastic Properties of Polymers* by J. D. Ferry, 3rd Edition, Wiley, New York, 1980). The rate is a very important factor when comparing a thermo-optic device that may swing more than 10° C. in one millisecond with a glass transition temperature measured by a DSC at 1° C./min. The difference in rate in this case is about six orders-of-magnitude. According to the rule of thumb, the effective Tg for such a thermo-optic device is about 18° C. higher than the Tg measured in the same materials system with a DSC. A very fast thermo-optic switch might have an effective Tg 24° C. or so higher than Tg. Even a slow-rise thermo-optic switch with a thermal swing of 3° C. in 100 milliseconds will still have an effective Tg about 9° C. larger than the Tg as measured by the DSC at 1° C. per minute.

One preferred embodiment of the invention is a thermo-optically controlled optical polymer waveguide TIR (total internal reflection) device 100 as shown in FIG. 3. As a thermo-optic device, or a device that transports optical energy subject to control by thermal means, it functions as a switchable deflector of optical radiation. Transparent polymers are employed to guide the light, namely polymers in which optical radiation propagates with a predetermined minimal amount of attenuation at the intended operating wavelength.

In FIG. 3 a multi-layer stack is constructed, namely several layers formed one on top of the next, in which an optically transparent polymer lower cladding layer 2 lies on a substrate 4. The lower cladding is preferably a polymer deposited by spin-coating. Alternatively, layer 2 can an inorganic or non-crosslinked organic material. Any deposition method known to those skilled in the art would appropriately be selected for deposition of alternative layers. A combination of lithographic definition of photoresist and RIE (reactive ion etching) processes as known in the prior art may be used to fabricate a trench 5 through the lower cladding layer 2. A core layer 6, also spun on, lies above the lower cladding and fills the trench 5. The spinning process produces a film that tends to planarize the surface, filling the trench 5. A third optical layer, the upper cladding 10, is also spun on. As is well known in the art, the thickness of each layer is adjusted by selecting the spinning speed. The layer thicknesses are approximately 5 $\mu$m, 1.2 $\mu$m, and 1.4 $\mu$m, respectively. As fully processed, the materials used in experimental construction of the three layers 4, 6, 10 provided indices of refraction of 1.488, 1.522, and 1.422, respectively. With a trench depth of about 0.06 $\mu$m and width of 6 $\mu$m, single ode guiding at 980 nm was achieved.

The materials used were: a Corning 1734 glass substrate 4, a Gelest UMS- 992 polyacrylate (Tg~45° C.) lower cladding 2, a Norland Optical Adhesive 68 (Tg=35° C.) core 6, and a Gelest UMS-182 polyacrylate (Tg below 0° C.) upper cladding 10. All three polymer materials are crosslinked by a UV cure step as specified by the manufacturers. These materials were chosen to improve overall dimensional and chemical stability. However, no evidence was found of bulk dimensional or chemical instabilities in devices so constructed.

A waveguide is any structure which permits the propagation of a wave along an optical path, throughout its length despite diffractive effects or curvature of the guide structure. Although the waveguide segment (a predetermined section of waveguide 12) shown in FIG. 3 is straight, the waveguide shape can easily be defined into much more complicated structures, if desired. By appropriately fabricating the mask used in defining the photoresist for the etch step, waveguide structures including curves, X- and Y-branches, parallel couplers can be incorporated. An optical waveguide is defined by a length of an extended bounding region of increased index of refraction relative to the surrounding medium. The strength of the guiding, or the confinement, of the wave depends on the wavelength, the index difference and the guide width. Stronger confinement leads generally to narrower modes. A waveguide may support either multiple optical modes or a single mode, depending on the strength of the confinement. In general, an optical mode is distinguished by its electro-magnetic field geometry in two dimensions by its polarization state, and by its wavelength. If the index of refraction change experienced by the optical mode is small enough (e.g. n=0.003) and the dimensions of the guide are narrow enough (e.g. 5.0 µm), the waveguide will only contain a single transverse mode (the lowest order mode) over a range of wavelengths. For larger refractive index differences and/or larger waveguide physical dimensions, the number of optical modes increases.

Waveguides of this nature are commonly referred to as rib waveguides. Dimensions of the etched trench (rib depth and width) are carefully controlled along with the thickness of the core layer to control the number and shape of propagating modes. Preferably the waveguide is designed to support only a single lowest order mode, eliminating the complexities associated with higher order modes. Higher order modes have different propagation constants than lower order modes, and higher scattering loss, which can be problematic in some applications. In other applications where higher power is desired, higher order modes might be more beneficial.

In a particular embodiment, a 100 nm layer of 80/20 NiCr is sputtered onto the top cladding layer and etched in its turn by standard lithographic means well known in the art, to form patterned structures such as the heater stripe 8. The control system 19, in this case a temperature control system (current source), controls the thermal excitation element which is the resistive heating element 8. The resistive element is oriented at an oblique angle (a few degrees) to the waveguide channel 5 beneath it. The control element supplies a sufficient amount of current to the heating element via an applicator electrode 9, fabricated as a thin gold layer over an enlarged area at the end of the heating element 8 such that the desired operating temperatures can be achieved. The resistive heating element 8 is an exciter since it produces the temperature change in the device in response to an applied current. The control system 19 forms an essential part of the exciter in the sense that it is the control system that generates and controls the current that leads to device operation. The increase of temperature achieved in the switch 100 as a function of time is essentially independent of external factors such as the device temperature, since the heat energy is applied during a short pulse; its time dependence is determined by its diffusion into the device. The resistive heating element 8 is an electrically conductive material such as a metal (in the preferred embodiment nickel-chromium) or other suitably conductive material that is deposited on the upper cladding. Deposition may also be achieved by chemical vapor deposition or other suitable technique for applying such materials. In the case of metallic electrodes, it may be best to incorporate an additional coating deposited below the electrode, to reduce the optical loss which occurs when a portion of the energy in the guided wave mode extends out to the metallic electrode.

The length of the heating element, 800 µm, is made to extend sufficiently before and beyond the region where the heating element passes over the waveguide so that activation of the heating element will produce temperature changes in the polymer that can be sensed by evanescent fields of the mode propagating in the waveguide.

The width of the heating element, about 20 µm, is selected to prevent or substantially reduce optical tunneling of optical radiation through the heated region of the waveguide. Optical tunneling is the coupling of light from a region of high refractive index through a region of lower refractive index to a region of higher refractive index. In general, the optical tunneling length will depend on the wavelength of the guided light, magnitude of the index change in the heated region, and length of the heated waveguide region.

The return to an equilibrium temperature is accomplished using a cooling element. The cooling element may be any element that assists in the removal of thermal energy by either convection, conduction, or radiation (e.g. thermoelectric cooler, heat-sink, thermal pipe). The cooling element regulates the nominal operating temperature of an element attached to the thermo-optic device. In the preferred embodiment, we use a glass substrate as a cooling element because of the low heat load. Depending on the application, higher thermal conductivity substrates such as ceramic, silicon, or even diamond may be used, and active heat removal steps may be used such as Peltier-effect (TE) coolers, vapor wick coolers, or water cooled or forced air heat exchangers. The effect of these cooling elements is to provide a pathway for the removal of thermal energy so that the device may be operated continuously or intermittently as desired but still remain within an operating temperature.

The operating temperature is the temperature of the polymer layer in the region traversed by the optical path, averaged over a time long compared to the optical response times to changes in the thermal excitation element but short compared to the times for environmental changes outside the device. The operating temperature is preferably controlled to within a desired range as determined by a sensor with a feedback loop to adjust the operation of a heater or cooler to maintain the desired temperature (for example, the minimum operating temperature) at the sensor as is well known in the art. The control loop may include feedforward to prepare for the effects of changes in pulse rate, etc. The minimum operating temperature is the lowest operating temperature allowed by the proper functioning of the device including any thermal control loop, when the ambient environment varies within the temperature, humidity, etc. values specified for device operation.

Figure 4:
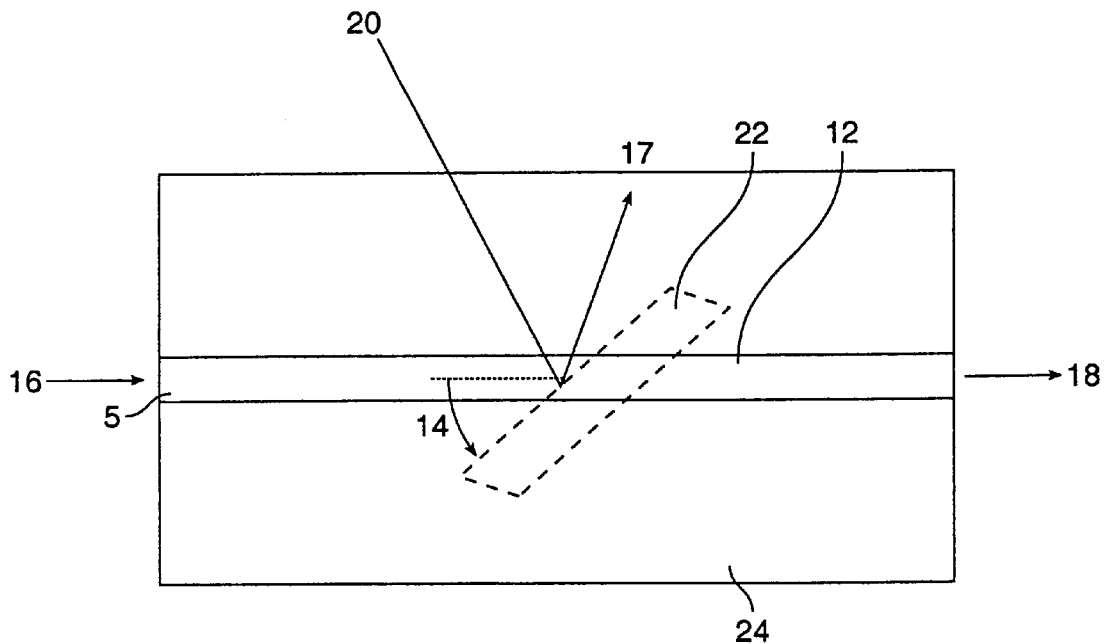
FIG. 4 is a cross-sectional view along axis 16–18 showing the core layer of the TIR switch of FIG. 3.

When the heating element is activated, thermal energy from the heating element diffuses into the surrounding polymer layers and increases the temperature of the polymer while simultaneously lowering the refractive index of the heated polymer via the thermo-optic effect. Polymer regions closer to the heating element experience a larger increase in temperature as a result of absorbing more thermal energy per unit area from the heating element than regions further from the heating element. FIG. 4 schematically shows a top view of the spatial variation in the refractive index in the polymer core layer during switch activation. As illustrated, region 22 for example, which is in proximity to the heating element (not shown) has a refractive index less than region 24 located further from the heating element.

If the refractive index change of the heated polymer is large enough and the angle 14 between the heating element and the waveguide is sufficiently shallow, optical radiation propagating in the waveguide undergoes total internal reflection at the interface 20, called the TIR interface, and optical radiation illustrated as a beam 17 is deflected from the rib waveguide. The deflected radiation 17 is mostly optically confined vertically to the core layer 6, although it propagates within the planar waveguide formed by the core layer outside of the region defined by the trench 5. Light deflected from the waveguide via switch activation may be used, collected, or rerouted using gratings, mirrors, lenses, or by any of several other means known to those skilled in the art which route radiation in or out of the plane defined by the layer 6 (FIG. 3).

The deflected optical radiation 17 can be used for any number of applications, for example optical beam routers, sensors and modulators. A plurality of heating elements can be placed along a single waveguide to deflect light out of the waveguide at any waveguide-heating element proximity. In addition, a single one or an array of heating elements can be placed above/below an array of waveguides depending upon the application in question.

The optical throughput is measured as the optical power in the beam 18 emerging from the waveguide after traversing the TIR switch 100. As a result of TIR reflection, throughput is decreased upon activation of the heating element. Because the reflected optical radiation of a rib waveguide TIR switch must overcome lateral waveguide confinement, rib waveguide TIR switches may not be as efficient as planar waveguide switches at the same level of excitation. (A planar waveguide switch is fabricated in the same way as described above in reference to FIG. 3, but without fabricating the trench; the input beam is confined in only one dimension, the dimension normal to the plane of the layer 6.)

Figure 5A:
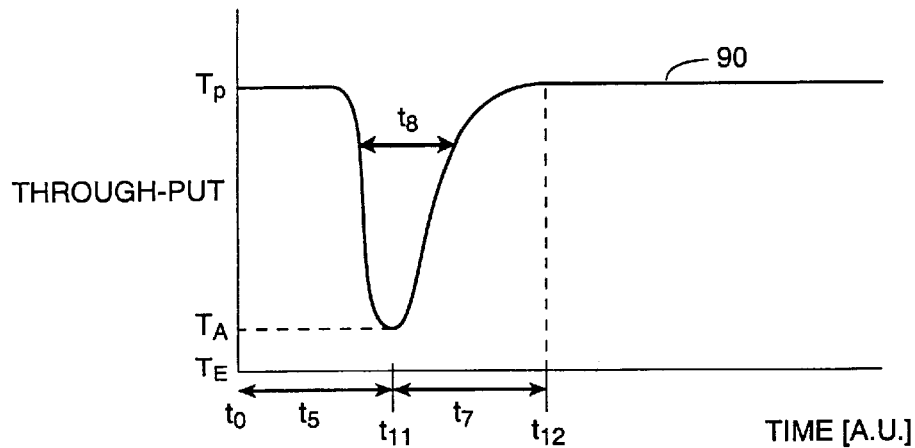
FIG. 5A, FIG. 5B and FIG. 5C are timing diagrams illustrating the throughput response obtained for a TIR switch over time, during which the switch is activated.
Figure 5B:
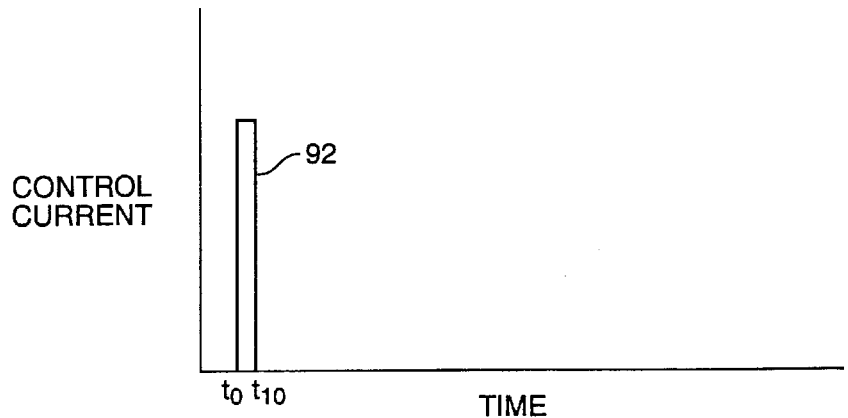
Figure 5C:
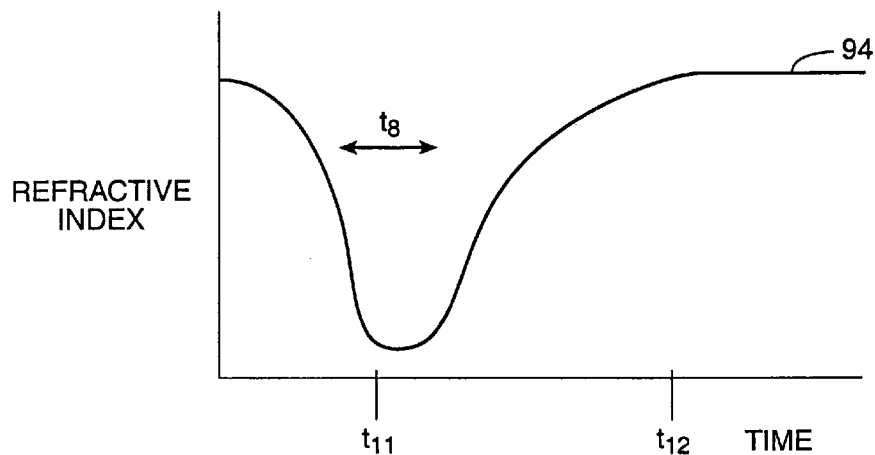

FIG. 5a shows a representation of the waveguide throughput 90 as a function of time. FIG. 5b illustrates that the switch is controlled by a current pulse 92, supplying maximum current to the switch at time $t_9$ and continuing to do so until time $t_{10}$ when it returns to its initial state. As shown in FIG. 5b, a control current pulse is turned on at time $t_9$ and off at time $t_{10}$, but the optical response (throughput) of the switch is not instantaneous. FIG. 5c shows the refractive index variation induced at a given depth below the heater element by the delivery of a single thermal energy pulse. The refractive index profile 94 of the polymer material changes as a function of time as a result of the applied current pulse 92. When the refractive index discontinuity experienced by the optical mode rises toward and above the level required for total internal reflection (TIR), light is deflected from the discontinuity, and the throughput drops as shown in FIG. 5a. It can be seen that a predetermined time is required to allow the switch to respond to the heat that has been supplied to it by means of the current pulse, such that the index change will enable switching to occur at time $t_{11}$ to cause the throughput of the waveguide to fall from a value of $T_P$ to a value of $T_A$. It can also be seen that a predetermined time is required to allow the switch to relax after the removal of heat, such that the index change of the polymer material enables the reflection to subside and the throughput of the waveguide to rise once again to (or substantially close to) its initial value $T_P$ at time $t_{12}$. The polymer material as shown requires a longer time to respond to the removal of the heat supply and consequently a longer time for the index of refraction to return to its initial state. The time for the optical throughput to return close to equilibrium is known as the decay time. Here the decay time $(t_{12}-t_{11})$ is longer than the width of the control pulse $(t_{10}-t_9)$.

The condition of the switch at a time such that only a predetermined minimum quantity of optical radiation is deflected from the waveguide designed is the "off" state. When the switch is in an "off" state, light propagates the entire length of the waveguide without being substantially perturbed. This condition occurs prior to switch activation and after deactivation. In general the response of the material to the thermal energy delivered by the heating element is limited by the thermal velocity of the heat through the polymer. This means the observed switched light is delayed in time with respect to the flow of electrical current through the heating element, depending on the thermal constants of the polymer layers and physical thickness of the components of the multi-layer stack. When an initially activated switch is deactivated the optical response is retarded in time with respect to cessation of current flow through the heating element.

Switch Fidelity

Figure 6:
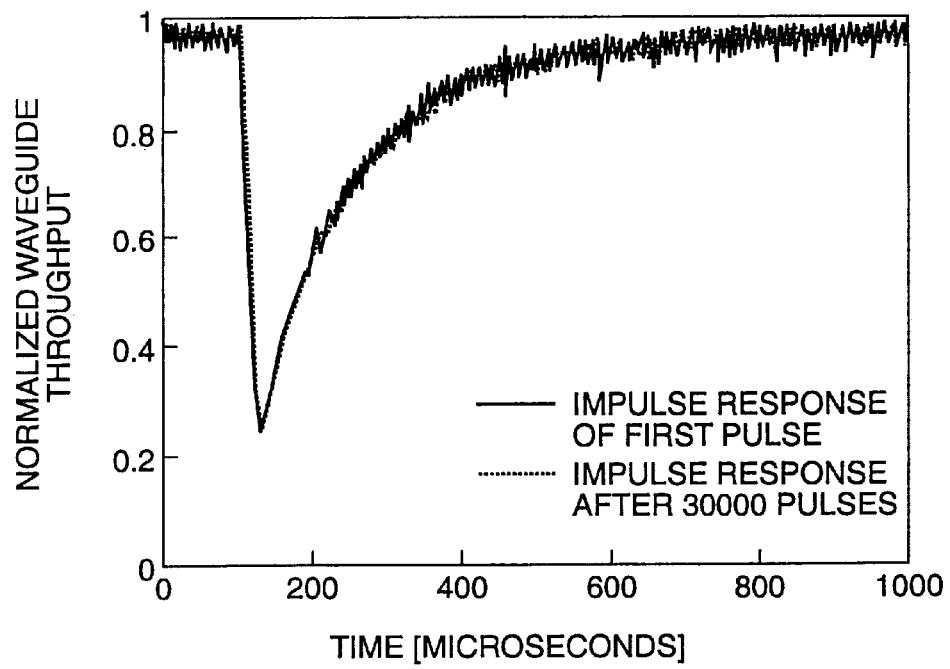
FIG. 6 is a timing diagram illustrating impulse response of a prior art TIR switch activated at a first excitation energy by a first pulse and a pulse after 30000 excitations.
Figure 7:
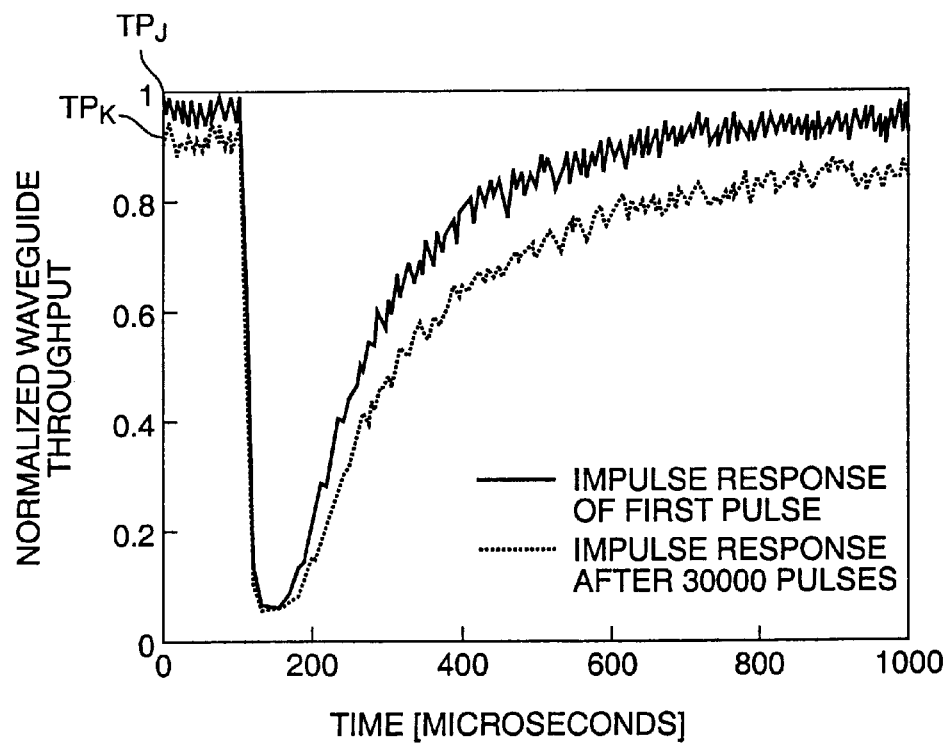
FIG. 7 is a timing diagram illustrating impulse response of a prior art TIR switch activated at second, higher excitation energy by a first pulse and a pulse after 30000 excitations.
Figure 8:
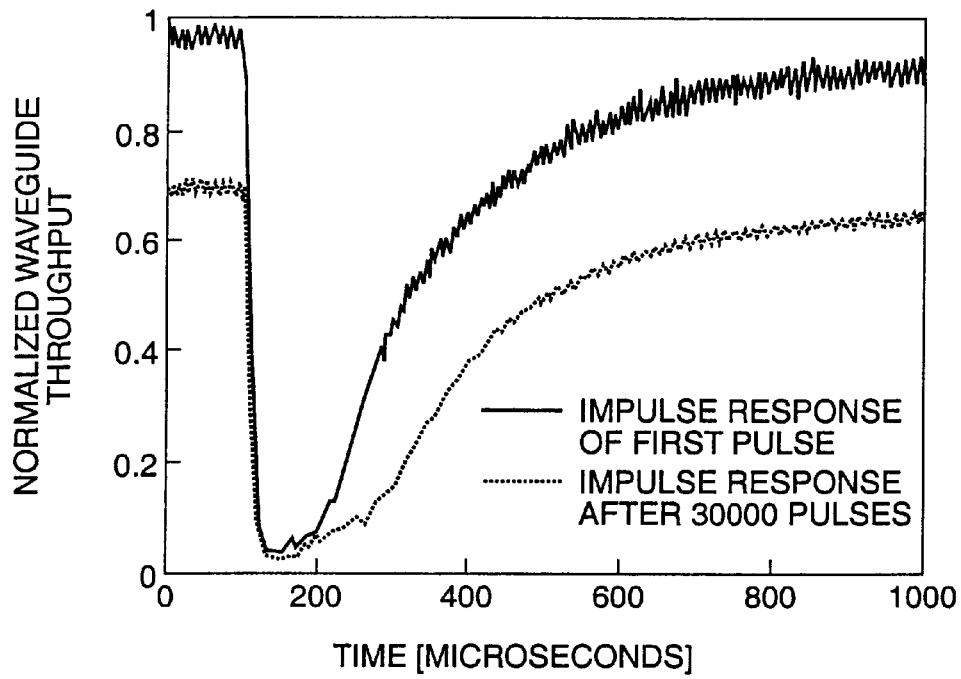
FIG. 8 is a timing diagram illustrating impulse response of a prior art TIR switch activated at a third still higher excitation energy by a first pulse and a pulse after 30000 excitations.

In order to understand the present invention, it is helpful to review certain properties of polymeric materials. In a linear system, the response of the system to an arbitrary input signal is given by the convolution of the input signal with the impulse response of the system. This system impulse response allows accurate prediction of system performance without having to measure the system response each time the input excitation may be changed. In a polymeric system where the input is from a thermal source, there are conventionally significant contributions from viscoelastic effects which can result in a change of the impulse response of the system, therefore modifying the system response to a specified input signal. In such a case, the actual system response is not equal to the response predicted based on a measurement of the system impulse response, and it is said that the fidelity of reproduction of the desired signal is impaired, or that the system response is distorted. The data illustrated in FIGS. 6 through 8 shows changes in the response due to viscoelastic behavior, and as explained hereinbelow is an indication of insertion loss. Specifically FIG. 6 shows optical transmission through a waveguide containing a 2-degree thermo-optic TIR switch when a thermal pulse of 200 pJ/$\mu$m$^2$ is applied to the heater stripe of dimensions 16 $\mu$m wide by 1300 $\mu$m long and where the materials were Ablestick L4092 epoxy, Epoxy-lite R46 polyurethane, and Epo-tek UV0134 epoxy, arranged in a triple stack of thickness' 5.0 $\mu$m, 1.2 $\mu$m and 1.4 $\mu$m respectively, counting away from the substrate and operating at about room temperature. The heat pulse is 20 microseconds long beginning at 100 microseconds. Since the heat pulse is very short compared to the throughput response of the switch, the measured response is essentially equal to the impulse response of the system. At this energy level, the impulse response after 10 minutes of pulsing at 50 Hz (30,000 pulses) is the same as the impulse response after the first pulse. FIG. 6 therefore shows an example of a linear system with good fidelity and low distortion. FIG. 7, taken under the same conditions of FIG. 6 but with the higher thermal pulse energy density level of 350 pJ/$\mu$m$^2$, shows that the impulse response is degraded after 30,000 pulses. The waveguide transmission (seen prior to the switch response) is reduced to about 90% of its prior value (insertion loss of about 0.5 dB), and the fall time is degraded to a longer time. Therein the polymer material has been driven above a threshold for initiation of a strong viscoelastic response. The threshold in this waveguide stack therefore lies somewhere between 200 pJ/$\mu$m$^2$ and 350 pJ/$\mu$m$^2$. As used herein, threshold means that for the quantity of interest, there is no substantial change below the threshold, but a change is observed above the threshold. As a result of the viscoelastic response of the material, the polymer near the switch heater stripe has acquired an index of refraction change or "set" which lasts for a time long compared to the time between switch pulses (20 ms). This index set turns the switch partially "on" where it had previously been completely "off", reflecting about 10% of the light out of the waveguide even in the "off" condition. In addition, the polymer decay time has been slowed by the viscoelastic response to the above-threshold excitation. FIG. 8 with an even higher excitation level of 480 pJ/$\mu$m$^2$ shows an even more pronounced example of a response dominated by viscoelastic behavior. The insertion loss is now about 1.5 dB, and the signal distortion shows a complex behavior involving both slower response time and multiple time responses.

In the extreme case of FIG. 8, the multiple peaks present in the impulse response indicate that there will be additional frequency components introduced into the switch response to an arbitrary signal, compared to a device operating below the threshold as in FIG. 6. These additional frequency components introduce an undesired distortion into the switch response.

According to the invention, the undesirable behaviors can be substantially reduced or eliminated by maintaining the temperature of the material above Tg, since the behaviors are tied to the viscoelastic response of the materials. The choices are to select optical waveguide materials with Tg below the operating temperature or to raise the operating temperature above the Tg of the materials.

Other characteristics of the switch response regarding its fidelity (e.g. rise time $t_5$, fall time $t_7$, activation temperature, and switch dwell time $t_8$, as illustrated in FIG. 5a, for example) may remain substantially unchanged after repeated cycles of operation under essentially similar operation conditions.

Switch Insertion Loss

According to the invention, use of one or more materials to fabricate the triple stack of FIG. 3 at a temperature above the Tg eliminates or reduces substantially several performance problems associated with the viscoelastic behavior of polymeric materials.

At a temperature below the Tg or the effective Tg of the material, thermal excitation causes the polymer near the heating element to acquire a persistent refractive index change with respect to the switch cycle time. This unwanted refractive index change may have a variety of undesirable effects. This problem is due to time dependent segmental mobility. The thermal input energy excites the polymer chains away from their previous state. However, after a very short time, the chains reach a quasi-equilibrium (low mobility state) as the temperature drops, but in a potentially different configuration than that experienced previously. This change in chain configuration may lead to changes in density leading to changes in the index of refraction and other material properties. Large single pulses or multiple smaller pulses can cause significant changes in the index of refraction of the material. However, we have also found that there is a favorable change in the viscoelastic response of the material as the operating temperature is brought near or above Tg, so that the magnitude of the long time constant refractive index change is reduced (or eliminated, i.e. reduced so far that no effects are seen during the lifetime of the device). Some viscoelastic contributions are diminished above the glass transition temperature of crosslinked polymer materials.

The additional loss observed in traversing an integrated optical device compared to an equal length of unperturbed waveguide is called the active insertion loss of a device. Specifically, referring to FIG. 4, when the switch is on, an input beam along axis 16 that is coupled into the waveguide channel 5 reflects off the TIR interface 20 and propagates out of the waveguide to form a deflected output beam along axis 17. When the switch is off, the input beam of axis 16 should propagate through the interface and continue along the waveguide to form an undeflected output beam along axis 18. Before switch activation, because the index difference at the TIR interface is low, the reflection in the off state is preferably very low. An "off" switch is preferably essentially invisible to light propagation in the waveguide, producing extremely low loss in the input guide. Low insertion loss is especially desirable when the input waveguide is a bus with many switches. The TIR switch region in the off-state may have negligible insertion loss when first fabricated, but the long time constant index of refraction change that occurs as a result of the thermal excitation can significantly increase the insertion loss.

In one experiment, a core material is used having a Tg that is nearly 120° C. above the operating temperature. A TIR switch angled at 2 degrees from the waveguide axis was fabricated from an Ablestick L4092 epoxy lower cladding layer (Tg=53° C.), an Epoxy-lite R46 polyurethane core layer (Tg=150° C.), and an Epo-tek UV0134 epoxy top cladding layer (Tg=148° C.), of thicknesses of 5 $\mu$m, 1.2 $\mu$m and 1.4 $\mu$m, respectively, on a glass substrate. FIGS. 6–8 show the measured variation in throughput as a function of time for this switch activated with energies of 200, 350, and 480 pJ/$\mu$m$^2$, respectively.

Specifically FIG. 6 shows the waveguide throughput for the first cycle of operation of a switch that is activated with an energy of 200 pJ/$\mu$m$^2$ and the waveguide throughput after the same switch is cycled for 10 minutes at 50 Hz (30,000 pulses). After 10 minutes of pulsing, the response of the TIR-switched waveguide is substantially equal to its response during the first cycle of operation. From this data we conclude that this energy density is below the threshold of degradation resulting from viscoelastic response of the material.

FIG. 7 shows the waveguide throughput of a TIR switched waveguide activated with an energy of 350 pJ/$\mu$m$^2$, a level at which the onset of degradation resulting from viscoelastic response occurs. After 10 minutes of cycling at 50 Hz the waveguide throughput, TP$_K$, (measured approximately 100 $\mu$sec prior to switch activation) decreased compared to the throughput measured prior to the first pulse, TP$_J$. This difference in waveguide throughput is insertion loss which has been induced by thermal cycling. The additional loss is due to a long-lived change in index induced in the region of the heating element, that we attribute to the viscoelastic response of the polymer. FIG. 8 shows the waveguide throughput of a similar TIR switch that is activated with an even higher energy 480 pJ/$\mu$m$^2$ which consequently creates a larger insertion loss (~26% after 30,000 pulses).

Figure 9:
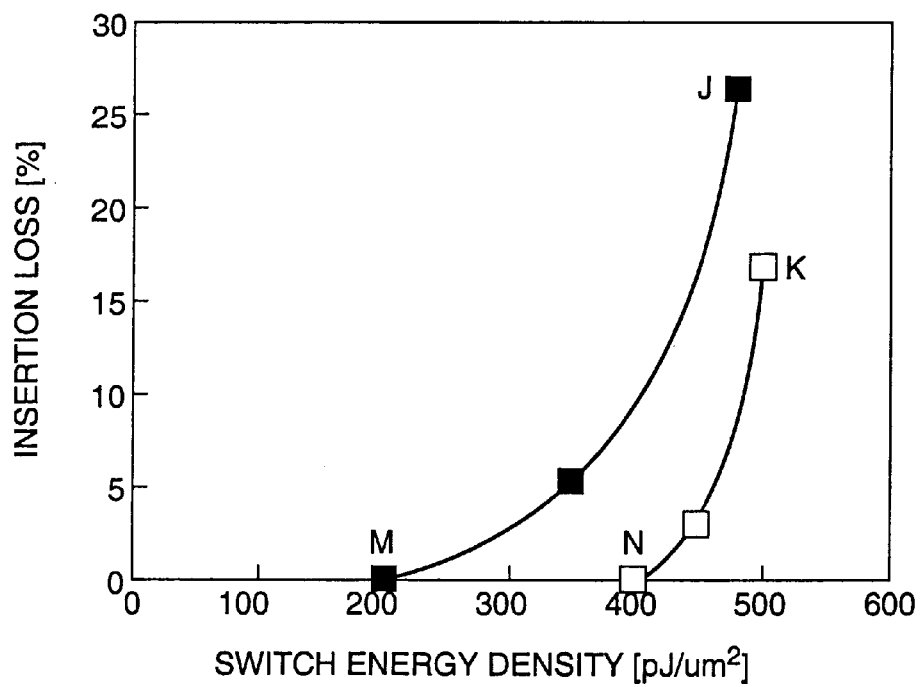
FIG. 9 is a diagram illustrating insertion loss experienced by the prior art TIR switch of FIGS. 6–8 and one according to the present invention.

FIG. 9 is a replot of the insertion loss calculated from FIGS. 6–8, as a function of the switch energy density. As shown, prior to switch activation at a certain energy the insertion loss is negligible. Above a certain switch energy density M near 200 pJ/$\mu$m$^2$ the observed insertion loss increases with switch activation energy. The energy at which the observable insertion loss increases with switch activation is the onset or threshold M of degradation resulting from viscoelastic effects. The threshold of degradation resulting from viscoelastic response is related at least to the quantities of time, temperature, and energy.

Trace K of FIG. 9 shows the measured insertion loss of a TIR switch incorporating the preferred, lower Tg polymer described above in reference to FIG. 3. The onset for the threshold of degradation resulting from viscoelastic effects occurs at a substantially higher energy N near 400 pJ/$\mu$m$^2$. The higher threshold of FIG. 9 results in negligible changes in the index of refraction over an operating lifetime of a device operating at a point sufficiently below threshold such as 250 pJ/$\mu$m$^2$. At this operating point, conventional devices made with high Tg materials will fail (i.e. show measurable changes in the index of refraction over an operating lifetime). We achieved this improvement in performance by reducing the Tg of the top cladding substantially below the operating temperature of the device, and by reducing the Tg of the core down to the neighborhood of the operating temperature. In our single pulse data, it should be noted that the operating temperature is room temperature, 23° C. In our multiple pulse data, the operating temperature is elevated somewhat above room temperature, decreasing the time-dependent viscoelastic contribution to the observed response, reducing the long time constant change in the index of refraction. It is expected that there will be a temperature rise in the range of 0–50° C. above room temperature, for 50 Hz operation, with pulse energy densities from 200 pJ/$\mu$m$^2$ to 1000 pJ/$\mu$m$^2$. In the multipulse data, we are therefore operating the top cladding layer at least 33° C. above its Tg. From the time dependence of our switch response our effective Tg is about 21° C. above Tg, so the cladding layer is operating at least 11° C. above its effective Tg. We are operating the core layer about 2° C. below Tg and about 23° C. below its effective Tg. The lower cladding is operated about 12° C. below Tg and about 33° C. below its effective Tg.

The top cladding material experiences the highest temperature changes in the inventive device where it is directly adjacent the heater stripe. The core layer and the lower cladding layers experience lower temperature excursions because of thermal diffusion. For this reason, the Tg of the top cladding should be well below the operating temperature. Doing this results in the marked improvement represented in FIG. 9. Further improvements can be obtained by lowering the Tg of the core and the lower cladding materials. It is expected that long-time-constant index changes should be minimized or eliminated in the top cladding since the materials exhibit no or minimal viscoelastic response at the operating temperature is above Tg. The threshold observed in FIG. 9 is related to contributions from the core and/or bottom cladding layers. The best mode is to provide core and lower cladding materials having an effective Tg below the operating temperature of the device. Using the rule of thumb described below, if the operating temperature is kept 20° C. above the Tg or the effective Tg, no viscoelastic effects are expected to appear.

The glass transition temperature of the materials is preferably lowest in the upper cladding and highest in the lower cladding. This arrangement allows any stress (mechanical or fabrication related) or related perturbation generated by the thermal switching pulse to be readily transported through the stack and transported away from the region where switching occurs and light is guided. Energy is dissipated most efficiently in materials with high mobility (and low glass transition temperatures), thus as perturbations propagate through the stack, stress and other forces are driven toward the lower cladding.

The viscoelastic regime (C) in FIG. 1, lies between the elastic (B) and the plastic (A) regimes. Viscoelasticity is defined as the deformation of a polymer specimen which is fully or partially reversible but time-dependent, and which associated with the distortion of polymer chains through activated local motion involving rotation around chemical bonds or related phenomena. Viscoelastic effects, usually observed in a temperature band near and below Tg, are demonstrated by a time-dependent response of the polymeric material. The materials are significantly influenced by the rate of straining or heating. For example, the longer the time to reach the final value of stress at a constant rate of stressing, the larger is the corresponding strain. The exact boundaries of the viscoelastic regime are poorly defined and application-dependent. A common rule of thumb is that viscoelastic effects are observed over common experimental time scales within a range of 20° C. below to 20° C. above the glass transition temperature. The exact range of temperatures is a function of the polymer chemistry, sample geometry, and the rate of change of the temperature during the experiment or the operation. Viscoelastic effects have been observed as far as 120° C. below Tg. For a complete discussion, see the book by Ferry referenced earlier. For the purposes of this document, the term viscoelastic will encompass both linear and nonlinear responses of the material involving molecular motion. Since thermal excitations induce molecular motions, viscoelastic responses are of particular concern in thermo-optic devices.

In the selection of materials for the construction of thermo optic devices, rate sensitivity should be observed as described in relation to FIG. 2. For a material to remain unaffected by viscoelastic contributions, its glass transition temperature would need to lie an additional amount lower than the Tg, for rapidly cycled devices. This effect is thus more significant the greater the rate or the shorter the active or "on" time under which the device operates. For example, a nanosecond pulse device would have about a ten order of magnitude rate effect, or a 30° C. increase in the effective glass transition temperature compared to Tg. The terminology of a "bulk" or "large-scale (macroscopic)" glass transition temperature will be used to describe a glass transition temperature measured in a slow manner (such as dilatometry). This is the type of glass transition often found in handbooks and literature; usually, if no rate information is presented with the glass transition data, the implication is that the data was measured sufficiently slowly to reflect the bulk or equilibrium-like properties.

If a device employs a polymer with a bulk or quasi-equilibrium glass transition temperature of 60° C. and operated such that switching occurred on the microsecond time scale (seven orders of magnitude rate effect change), the effective glass transition would be about 80° C. The measured dn/dT using a quasi-equilibrium method shows that dn/dT increases above about 60° C. (as shown in FIG. 1) and thus one may conclude that a device operating above 60° C. should show an enhanced thermo-optic effect. However, the device operating temperature would have to be raised above about 80° C. to see this enhancement in a rapidly switched device.

Operating a device above the glass transition temperature is potentially a problem. Non-crosslinked materials lose dimensional stability above Tg and thus flow. This problem may be resolved in practice by surrounding the material with rigid structures that contain the material, maintain its shape, and prevent it from flowing. Or, the problem may be resolved without use of surrounding structures by crosslinking the material such as in sol-gels, crosslinked polymers, etc. A crosslinked polymer is defined as a network formed by a multifunctional monomer/polymer. In a loosely-crosslinked material, local freedom of motion associated with small-scale motion of chain movement of chain segments is retained, but large-scale movement (flow) is prevented by the restraint of a diffuse network structure. The crosslinked network extending throughout the final article is stable to heat and cannot be made to flow or melt under conditions that linear polymers will flow or melt. Glass transitions as low as minus 100° C. have been readily achieved in crosslinked systems; the presence of a glass transition indicates that the polymer chains retain moderate to high local mobility while the crosslinks prevent flow. By operating optical devices made by crosslinked polymer materials in this regime, the favorable viscoelastic behavior may be exploited without losing dimensional stability. The chemical stability of crosslinked materials is also generally enhanced over non-crosslinked materials. For example, lower solvent penetration minimizes solubility, and greater functionality limits residual reactive sites that could cause decomposition or degradation during use, and cycling materials leads to stable water and solvent absorption.

Viscoelastic effects contribute to the degradation of optical switching devices by, for example, causing changes in optical throughput of the waveguide with time as described above, and/or affecting the rise, fall and dwell times of the switch. Viscoelastic effects can restrict the operating range of a device and limit both the application specifications and additionally limit the stability and lifetime of the device. In order to build and operate successful optical devices, viscoelastic effects must be minimized or eliminated under the device operating conditions. Viscoelastic effects that lead to permanent (or persistent) variation of the material properties of the core or cladding layers may also contribute to failure modes such as switch insertion loss. Other degradation mechanisms that need be considered include fatigue, creep and aging.

Fatigue occurs in structures subjected to dynamic and fluctuating stresses (similar to those experienced in the repeated thermal cycling of the thermo-optic polymeric devices). The fatigue limit and fatigue life are greater for crosslinked polymers as compared to those that are not crosslinked. Both fatigue and creep (slow continuous deformation) are minimized or eliminated in elastic, crosslinked polymers.

Thermal history is an important parameter in determining viscoelastic and thermomechanical behavior. For example, in quenching amorphous polymers from above Tg, the free volume or local mobility is increased, which facilitates relaxation and recovery. Annealing the polymer below Tg decreases free volume and enthalpy, increasing the yield stress and decreasing fracture toughness. (This phenomenon, known as aging, is well described in the polymer research literature; see for example *Physical Aging of Polymers* by John M. Hutchinson, *Prog. Polym. Sci.,* Vol. 20, 703–760, 1995). Aging refers to changes in the polymer properties with time, including embrittlement, changes in index, changes in density, and other factors that will cause optical device degradation.

Other factors which cause performance degradation include mechanical stress relaxation and processing induced residual stresses which can cause refractive index changes in the material that may degrade device performance efficiency, e.g. switch efficiency. When polymer films are laid down onto substrates, the deposition processes may induce stresses in the film which remain to a degree as residual stresses after completion of all the process steps involved in fabricating a part. These stresses should be different in the direction in the plane of the surface of the substrate, as compared to in the direction normal to the plane of the substrate. Since stresses generally produce a change in the optical index of refraction, such differential stresses produce slightly different index values for TE and TM optical polarization (in the plane and normal to the plane, respectively). As a result, the polymer film is birefringent. By operating a device above the Tg of one of more of the films, this birefringence is minimized. Above the Tg, the polymer chains acquire a degree of freedom of motion (limited by their viscoelastic properties, the amount of allowed motion depending upon the properties of the polymer such as the chain rigidity and the crosslink density) which allows the material to relax under the applied strain. The relaxation effectively reduces the birefringence. A reduction in birefringence is desirable for many optical devices.

Gratings, which are discussed in more detail later, are particularly sensitive to birefringence because the two polarizations which may be propagating in the waveguide that transits the grating experience different index of refraction. The resonant frequency of the grating. (The highest peak of the grating spectrum) depends on the index of refraction, so gratings fabricated in birefringent films will exhibit a frequency dependence that is different for the two polarizations. Operating such devices above the Tg to exploit the high mobility relaxation therefore significantly improves their performance characteristics (reducing their polarization dependence).

In general, the benefits of using a optical material system with at least one crosslinked transparent polymer with an effective glass transition below the operating temperature may be exemplified in part as follows: By operating above the viscoelastic regime, thermal cycling will not lead to time-dependent responses such as increased cycle time and switch insertion loss resulting from thermally-induced materials changes such as density drift, index of refraction changes, volumetric evolution, and thermal stress build-up. Additionally, the device may be operated over a significantly broader range of application temperatures/service temperatures without fatigue, embrittlement, cracking, and crazing. This enhances the device performance and commercial viability of a given device technology. The reproducibility of the information obtained from a device as embodied in this invention is also enhanced, since time-dependent effects are minimized or eliminated.

As indicated above, viscoelastic effects can restrict the operating temperature range of a device, and limit both the application specifications and the stability and lifetime of the device. If viscoelastic effects on all time scales of interest to the device during operation and use can be avoided, it will provide a time-independent device which can be reproducible, stable, and robust to operation. The present invention addresses the need to provide optoelectronic and photonic devices that are less affected by viscoelastic effects.

Degradation in material properties from viscoelastic effects may lead to a variety of failure mechanisms. Viscoelastic effects are the result of time dependent rearrangements of the polymer segments which are long on the time scale of the perturbation applied. In order to compete effectively in the marketplace advances in both performance and reliability must be achieved. Degradation in material properties from viscoelastic effects include failure mechanisms relating to changes in density, volume, thermal (thermal conductivity, coefficient of thermal expansion), mechanical (stress relaxation, modulus), electrical (dielectric constant), magnetic (susceptibility), optical (index of refraction, loss), chemical (solvent stability, environmental stability) and processing (residual stress, manufacturability) characteristics. Note that the degradation resulting from viscoelastic effects listed above may occur independently, sequentially, or in combination whether or not they are observed over the time scales of measurement.

The device fabricated in this embodiment using the materials described above will have a multiplicity of benefits that can be obtained by exploiting the viscoelastic properties of the materials above Tg. These benefits include but are not limited to, an enhanced thermo-optic coefficient, improved switching efficiency, reduced energy consumption, faster switch response time, improved cycle time, extended operational lifetimes and switch fidelity, reduced creep, linearity of index of refraction as a function of temperature, and reduced birefringence.

Enhanced Thermo-optic Coefficient

Larger dn/dT values, specifically for TIR switches, enable lower operating temperatures to be utilized. Therefore to exploit lower design temperatures, it is desirable to fabricate devices using polymers with larger thermo-optic coefficients. The vertical axis of FIG. 1 is related by a multiplicative constant to the index of refraction of the material. It follows that larger values of dn/dT can be obtained by operating above Tg. We measured dn/dt values of several polymers as a function of Tg. In Table 1 below, values of dn/dT are listed for several polymers, which results have been obtained by either the inventors or were reported in R. S. Moshrefzadeh. *J. Lightwave Technol.*, Vol. 10, April 1992, pp. 423–425. Polystyrene (PS), poly(methyl methacrylate) (PMMA), polycarbonate (PC), polyimide (PI) and polyurethane are high Tg (Tg>100° C.) linear polymers (thermoplastics), Norland 61, Norland 68, are crosslinked epoxies with Tgs of about 100° C. and 35° C. respectively. We have observed thermo-optic coefficients that are two to three times higher in lightly crosslinked lower Tg materials as compared to higher Tg linear and crosslinked materials.

TABLE 1

| Material | dn/dT (× 10$^{-4}$) [1/° C.] | Tg [° C.] |
| --- | --- | --- |
| Polyimide | −1.5 | 250 |
| Polyurethane | −1.4 | 150 |
| PC/MA | −1.3 | 130 |
| PS | −0.83 | 100 |
| PMMA | −1.1 | 100 |
| Norland 61 | −2.6 | 80 |
| Norland 68 | −3.1 | 35 |

Using the Norland crosslinked polymers, higher values of dn/dT were obtained because of enhanced local mobility of the polymer chains at the operating condition; the lower glass transition implies higher mobility for this experiment. The data in Table 1 suggests that further enhancements in the thermo-optic coefficients may be realized by further reducing the Tg of the polymer below the operating temperature.

Switching Efficiency

Using materials from the family described above, increased switching efficiency may be obtained compared to similar devices fabricated using high Tg materials operated under identical conditions (same wavelength, switch energy, etc.). The increased switching efficiency results from the lower switch activation energy required to induce the same refractive index difference at the TIR interface.

In the above example the TIR switch is designed to operate in a temperature range such that a predetermined minimum quantity of optical radiation is deflected from the waveguide, depending upon application and field of use. Switching efficiency is determined by first measuring the waveguide throughput, Tp, before device activation and then during switch activation, $T_A$. The switch efficiency is calculated using the expression eff=1−$T_A$/$T_P$. Switching efficiency refers to the maximum amount of optical radiation deflected from the waveguide when a switch is activated under repetitive pulsing at 50 Hz compared to the throughput of the waveguide when the switch is in the "off" state.

Table 2 lists the results of switch efficiency measurements on devices containing thermo-optic TIR switches that were operated at temperatures near 23° C. Device 1 was a 2-degree thermo-optic switch comprising the high Tg materials set described above (Epo-tek/Epoxy-lite/Ablestick) on a glass substrate. Device 2 is a preferred embodiment fabricated with lower Tg materials (Gelest/Norland/Gelest) on glass with nominally the same switch geometry and layer thicknesses. In all measurements, essentially similar TIR switches were activated with a current pulse that delivered 200 pJ/μm$^2$ of energy to the heating element and the switch efficiency was measured as described earlier. As Table 2 shows, devices that incorporated our lower Tg material system had much improved switch efficiencies. The switch efficiency increased from near 0% to approximately 80% when the thermo-optic coefficient of the core layer was changed from −1.4×10$^{-4}$[1/C] to −3.3×10$^{-4}$[1/C]. These results show that the switch efficiency can be improved by operating the device near or above the glass transition temperature of the polymers used in the optical waveguide.

TABLE 2

| | Core Layer | Tg | Switch efficiency at 200 pJ/μm$^2$ |
| --- | --- | --- | --- |
| Device 1 | Epoxy-Lite R46 | +150° C. | ~0% |
| Device 2 | Norland 68 | +35° C. | 80% |

Although we used room temperature devices, the same effect of using a using a lower Tg/higher mobility polymer can be achieved with higher Tg materials by heating the device to operate at a nominal operating temperature that equals or exceeds the Tg or the effective Tg.

Switch Energy Consumption

The device fabricated in this embodiment requires the control element to deliver less electrical energy to the switch element since larger thermo-optic coefficients enable lower operation temperatures to achieve the same or perhaps better switch efficiency than similar devices fabricated using higher Tg materials. To illustrate this point further we tested Device 1 and Device 2 as described above, by measuring the amount of electrical energy that produced a predetermined switch efficiency of ~80% in each of the devices. Table 3 lists the electrical energy supplied to the TIR heating element to achieve nearly 80% switch efficiency. The data in Table 3 indicates that devices incorporating material layers with larger thermo-optic coefficients required less electrical energy to achieve similar switch efficiency than devices comprised of higher Tg materials. Again, these results show that the switch energy consumption can be reduced by operating the device near or above the glass transition temperature of the polymers used in the optical waveguide.

TABLE 3

| | Core Layer | Tg | Energy for 80% switch efficiency |
| --- | --- | --- | --- |
| Device 1 | Epoxy-Lite R46 | +150° C. | >450 pJ/μm$^2$ |
| Device 2 | Norland 68 | +35° C. | 200 pJ/μm$^2$ |

Switch Cycle Time

Figure 10:
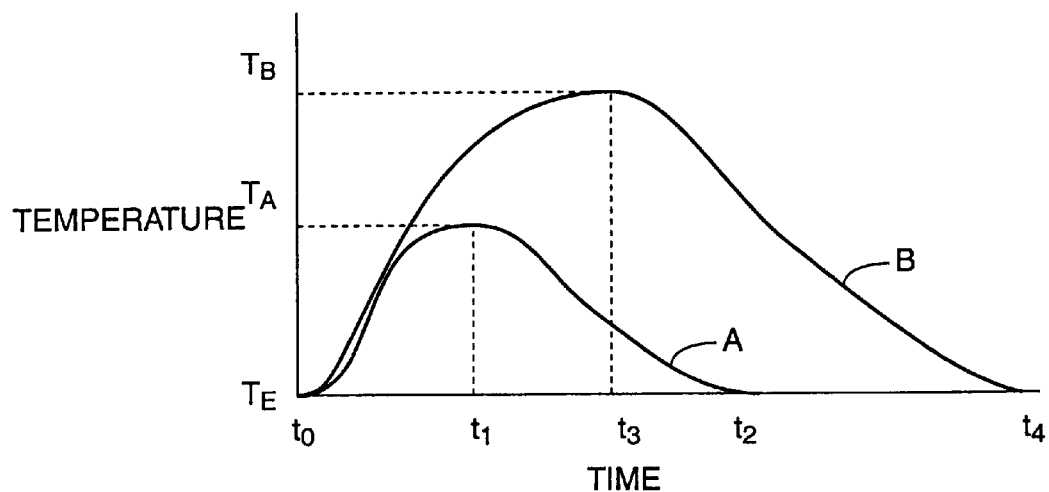
FIG. 10 is a diagram illustrating the temperature required for activation of a TIR switch according to the present invention compared to a conventional TIR switch.

The device fabricated in this embodiment produces a faster switch for a given heating rate since lower minimum operating temperatures are necessary to achieve the refractive index differential to achieve TIR switch activation. FIG. 10 shows temperature responses for two different polymer TIR switches. Trace A illustrates the temperature response of a device incorporating a high mobility/lower Tg/large dn/dT polymer that is operated at a temperature to achieve TIR switch activation. The switch reaches the activation temperature, $T_A$, enabling TIR switching to occur at a time $t_1$. After the switch has been deactivated the temperature returns to equilibrium, a value $T_E$, close to its original temperature at a time $t_2$. The switch "cycle time" for this high mobility/lower Tg/larger dn/dT polymer switch is ($t_2$−$t_0$).

Trace B illustrates a device incorporating a higher Tg polymer switch that is operated at a temperature to achieve TIR. After a larger application of thermal energy than for the switch of Trace A, the switch of Trace B reaches the activation temperature, $T_B$, enabling TIR switching to occur at a time $t_3$, later than the time $t_1$. After the switch has been deactivated, the temperature returns to equilibrium, $T_E$, a temperature close to its original temperature at a time $t_4$ and consequently the refractive index of the polymer material reverts to its equilibrium state. The switch cycle time for this higher Tg polymer switch is $(t_4-t_0)$. Note that it takes longer to return to a temperature near equilibrium from a higher temperature than it does from a lower temperature, thus increasing the switch cycle time. The switch cycle time can be improved by operating the device near or above the glass transition temperature of the polymers used in the optical waveguide.

Note that the benefits described above may occur independently, sequentially, or in combination whether or not they are observable in a specific device.

Many variations in implementation apply to this invention. Most importantly, any material known in the art with a glass transition temperature may be used for the waveguide materials, including urethanes, siloxanes, acrylates, fluoroelastomers, alkenes, dienes, ayrlates, methyacrylics, methacrylic acid esters, vinyl ethers, vinyl esters, oxides, and esters or perhaps other polymers that possess tailorable Tg's, and optical transparency. These materials may be combined with other materials known in the art including glass, polymer, semiconductor, sol-gel, aero-gel, and/or metal, to form the desired waveguiding structure, provided that at least one of the materials in the waveguiding structure (i.e. traversed by at least an evanescent field of optical radiation) is a polymer operated above Tg.

Other types of waveguiding structures known in the art can be used, including ridge waveguides fabricated into the core rather than the lower cladding, patterned waveguides formed from four-layer (or more) stacks, cladding-loaded waveguides, buried waveguides, diffused waveguides, photodefined waveguides, bleached or poled waveguides, serial grafted guiding structures, etc., provided that a local index enhancement is produced within the boundaries of the desired guided mode pattern. The local index enhancement may by symmetric or asymmetric relative to the center of the waveguide, and different combinations of refractive indexes may be used as is known in the art. Patterning techniques known in the art that can be used include wet etching, in- or out-diffusion, liftoff, laser ablation, focused ion beam processing, etc. Coating techniques known in the art that can be used include spinning, extrusion, slot-die, evaporation or vapor phase deposition, meniscus coating, lamination, etc. Substrates may be chosen from among many known in the art including glass, silicon, metal, semiconductor, polymer, etc.

Other resistive films known in the art may also be chosen, including NiCr, WSi, SiN, other metals and compounds, and various other forms of silicon such as amorphous silicon, and all these films may be doped with other species to improve their properties, provided that the resistivity obtained with the film is adequate for heating the waveguide in the thermo-optic region. The resistive film pattern may or may not include electrode structures made of other materials such as conductive polymers, metals including Al, Cu, Pd, solder, etc., but these connection structures are preferably made of a high conductivity material that enhances the connection process to the external electronic leads that should be connected to the control element with low contact resistance.

Other switch elements (including Y-branch switches, crossing waveguides, parallel couplers, gratings, electro-optic and electro-strictive devices, etc.) could be used in place of the TIR switch. It will be apparent to those of ordinary skill in the art that certain modifications well known in the art will be required to enable the alternative devices to operate as desired. For example, in an electro-optic grating which requires the use of an electro-optic polymer layer as compared to the thermo-optic polymer layer in the example above, the control element would be in the form of a voltage supply. Supplying voltage to an electrode placed over the waveguide in a similar fashion to the resistive heating element described above creates an electric field in the electro-optic polymer layer, and changes its refractive index through the electro-optic effect. Ultimately switch activation will cause the deflection of light from the waveguide as in the previous example. However, double crosslinking of the chromophores will be desirable to maintain their orientation when operating the materials above their Tg to exploit the favorable viscoelastic properties. In some applications it may be advantageous to deposit additional layers (e.g. for heaters, for hermetic layers, opaque layers, etc.) as device and material requirements necessitate.

The TIR switch is an example of a controller that controls the propagation of optical radiation in a transparent material. Other examples include Mach-Zehnder modulators, Y-branch splitters, gratings, parallel couplers, and many others including in general thermo-optic, electro-optic, and acousto-optic devices and devices actuated by applied stress or strain.

These alternatives may be combined with any of the devices or implementations of our invention described herein, repeated units may be fabricated, and parts of one device described here many be integrated with all or parts of other devices described here, or known in the prior art.

Mach-Zehnder Modulator

Figure 11:
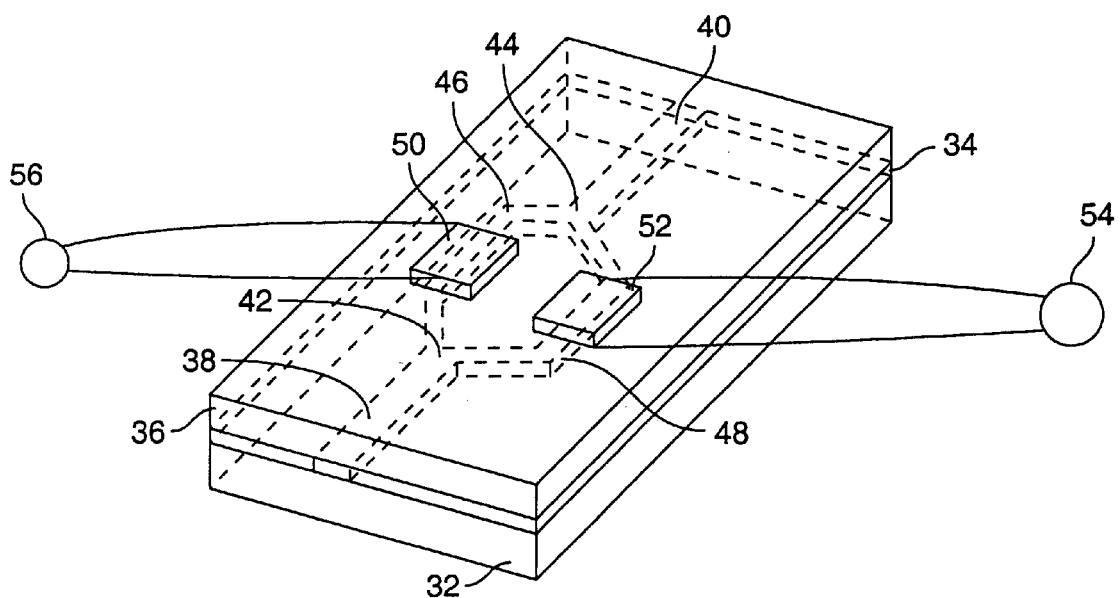
FIG. 11 is a perspective view of a Mach-Zehnder modulator in accordance with the present invention.

An illustration of a thermo-optic Mach-Zehnder modulator is shown in FIG. 11. This figure shows a three-dimensional rendering of a multi-layer stack comprised of a lower cladding layer 32, a crosslinked polymer waveguide core layer 34, into which a waveguiding structure has been defined by one of many means described earlier, and a crosslinked polymer top cladding layer 36. The core layer contains input and output waveguides, 38 and 40 respectively, input and output y-branches, 42 and 44 respectively, bias and a signal waveguides, arms 46 and 48. Located over the bias and signal waveguides on top of the multi-layer stack are two resistive heating elements, one of which serves as a bias heating element 50 and the other as the modulating heating element 52. There are control elements 56 and 54 to individually supply current to the bias heating element and modulating heating element respectively.

In this optical device, light enters through an input waveguide 38 where it is then split in the input y-branch and propagates into the bias and the signal waveguides. In the absence of any control current to the heating elements, light propagating in bias and signal waveguides are recombined at the output y-branch and interfere constructively or destructively according to the relative phases and finally exit the device through the output waveguide 40.

The control current supplied to the bias heating element is adjusted to change the temperature Tbias and hence the steady state refractive index of the polymer in the proximity of the bias heating element n1(Tbias). The refractive index change caused by the thermo-optic effect changes the optical path length of the light in proximity to the bias heating element such that the optical phase difference between the two arms of the interferometer is nearly $+/-\pi/4$ and a half-maximum optical intensity is observed at the output waveguide. A modulated control current is then applied to the modulating heating element. Since the device is biased at the half-maximum intensity location, subsequent device output will be proportional to the applied driving current for small modulation currents. Changes in the control current will result in time dependent optical response.

The optimum performance of this device under repetitive cycling of the modulating current requires a polymer material that returns to equilibrium or near equilibrium when the modulating control current is turned-off and minimal drift of the refractive index of the polymer near the bias heating element. If the material properties of the polymer, for example the refractive index, density, or volume in proximity to the heating elements evolve with time, the required bias temperature to achieve $\pi/4$ optical phase shift will differ from the originally designed temperature. When operating such devices below the Tg of the optical materials as in the prior art, differential index changes can build up that unbalance the phase of the two beams in the output 40 and device performance will degrade. This degradation may be partially compensated by changing the bias temperature controlled by the heating and control elements 50 and 56, but in practice a drift in the bias temperature usually requires additional hybrid feedback or tracking electronics. For device simplicity and cost concerns, it is desirable to have devices that function normally without additional control electronics.

Figure 12:
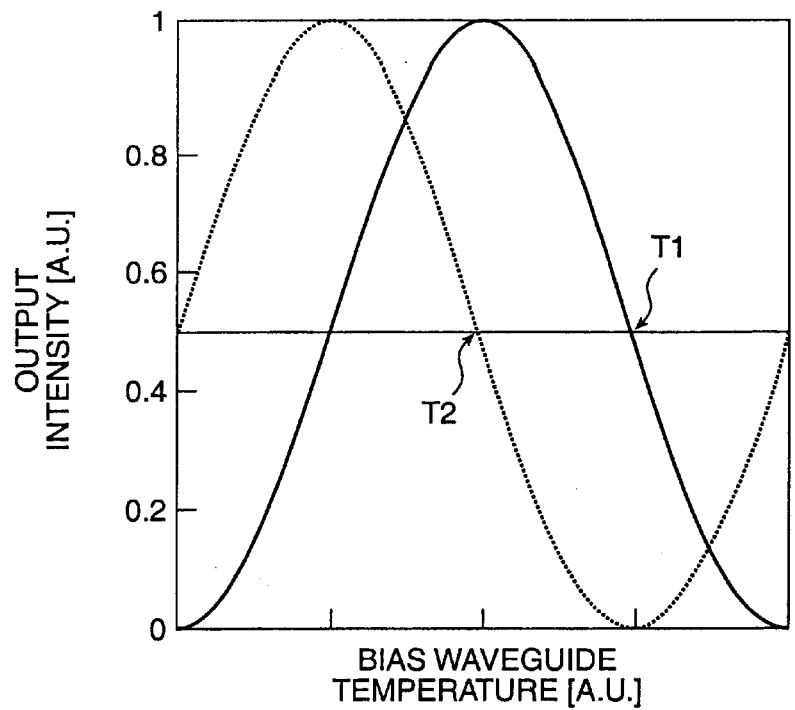
FIG. 12 is a diagram illustrating how the appearance of a particular form of viscoelastic affect degrades device performance.

FIG. 12 illustrates how changes in the bias temperature affect the intensity of the output light. The figure shows the output signal intensity as a function of bias waveguide temperature (Tbias) plotted as a solid line and indicates the temperature at which the interferometer is originally biased at T1. If the material properties change due to viscoelastic material response, the optical response of the device will also change so that a different temperature, T2, is now required to attain the same $\pi/4$ phase shift (dotted line on the figure). A device designed to operate with a bias temperature T1 no longer functions as intended. Furthermore, if the guide properties of either arm of the interferometer change with respect to the other (as by changes in density due to the viscoelastic response), the splitting of light at the input y-branch will be unbalanced and the contrast ratio of the interferometer will decrease in time.

For the device to operate with negligible decrease in contrast ratio and at the temperature intended without additional control electronics, it is desirable to utilize materials with negligible viscoelastic response. A device comprised of lower Tg material would be less effected by viscoelastic effects and as such would function more reliably than devices comprised of materials exhibiting observable viscoelastic responses.

Y-branch Splitter

Figure 13:
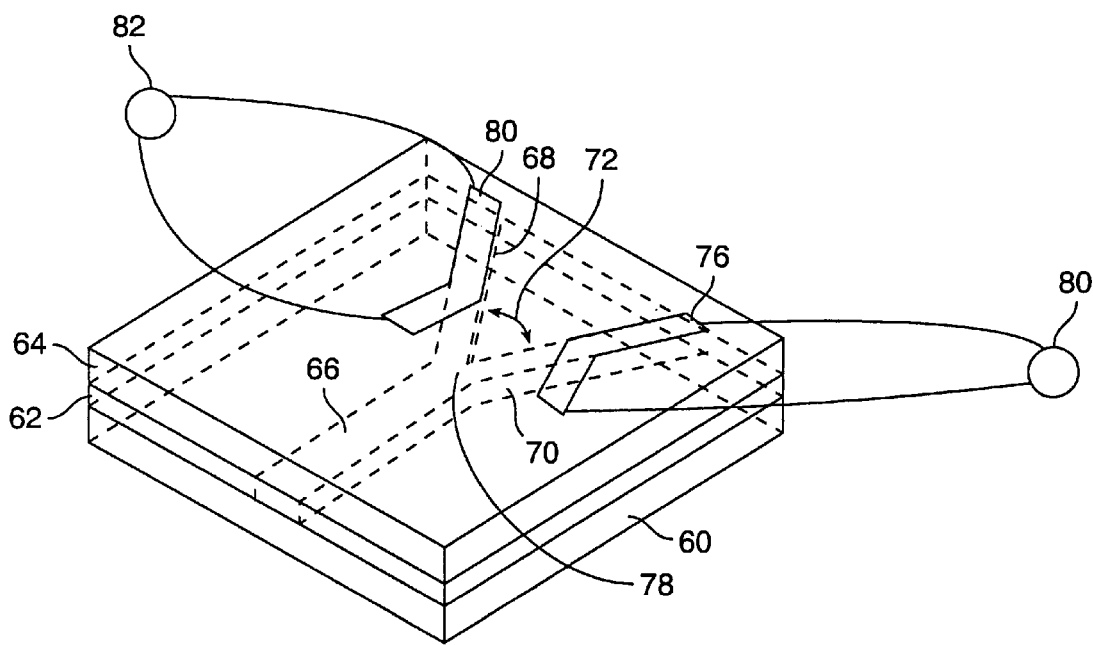
FIG. 13 is a perspective view of a Y-branch splitter in accordance with the present invention.

FIG. 13 shows a top view of a three-layer stack comprising a lower cladding layer 60, a crosslinked polymer waveguide core layer 62 (into which waveguide structure has been defined by means described earlier), and a crosslinked polymer top cladding layer 64. The core layer contains an input waveguide 66, and two output waveguides 68 and 70, with an angle of separation 72 between them. Located on the stack are two resistive heating elements 74, 76 which lie approximately over the output waveguides and have nearly the same width. Each switching element is powered by a current supply 80, 82 so that either electrode can be individually activated. The figure also shows a waveguide branch where the single input waveguide splits into the two output waveguides at 78. The heating elements are offset from the branching section to allow a gradual heating (as viewed along the axis of one branch of the waveguide as compared to the other (deactivated side).

A heating element increases the temperature of the polymer material near it, and lowers the effective refractive index of output waveguide under the activated heating element compared to the unheated output waveguide as a result of the thermo-optic effect. Light will preferentially couple into the output waveguide with the higher effective refractive index as is well known in the art. Such a design produces an adiabatic thermal heating of a region in proximity to the activated heating element. Without any current applied, light entering the branch from the input waveguide is split between output waveguides.

Such devices that operate at temperatures near or below the effective Tg are inherently susceptible to changes in material properties from viscoelastic effects. For example, consider the case of a permanent change of the refractive index in polymer material of one of the output waveguides compared to the other as a result of viscoelastic effects. If the refractive index of polymer material under the heating element of either waveguide evolves with repeated switch operation, failure in the form of preferential routing of light into the waveguide with a higher refractive index will occur, even in the absence of a control current to the heating element.

Figure 14:
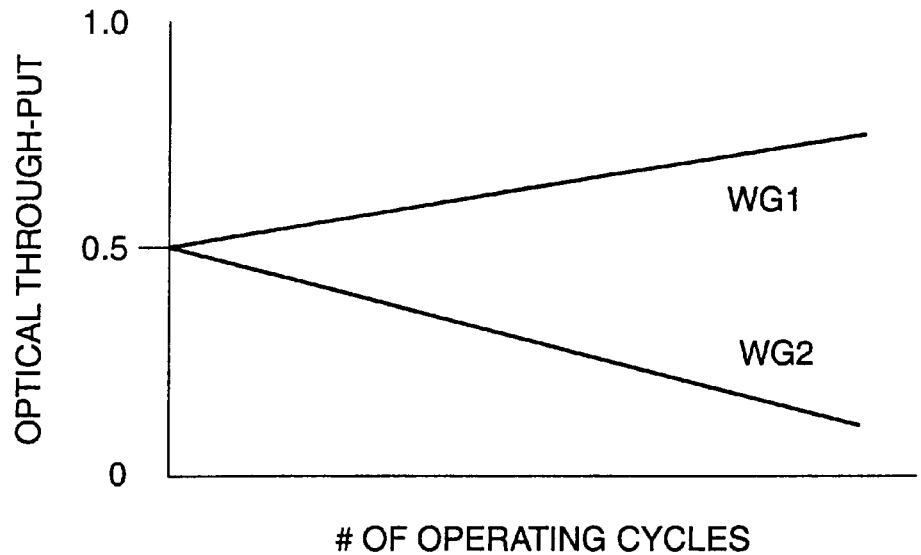
FIG. 14 is a diagram showing the power output of a device of the prior art to the device of FIG. 13 after a number of operation cycles.

FIG. 14 illustrates the Y-branch degradation mode of a splitter utilizing high Tg polymer material(s). The figure shows an example of the optical power in each output waveguide after the completion of a given number of operation cycles of switch 76. Initially, the Y-branch equally distributes power into both output waveguides, by design. As the number of cycles increases, viscoelastic effects cause a long time constant refractive index change, and the branching symmetry is broken. Eventually a state may be reached when the splitting of light into the output waveguides in highly asymmetric when neither heating element is activated, and the device no longer functions as the desired EDB splitter in the off-state. We have shown the evolution to be linear, but the detailed temporal form of the throughput change in a given application depends on both the materials used, the pattern of arrival of switching control signals.

As stated earlier, if a substantially permanent index of refraction change occurs in the polymer material under a heating element (76), light will preferentially route into the waveguide with the higher refractive index (68). In order to route light into output waveguide (70) a higher current would be required to overcome the preferential routing caused by damage (the degradation in material properties) to output waveguide 70. If the cycle is repeated, excess damage will be incurred in each cycle. The failure mechanisms described above will be reduced or eliminated if the device is fabricated using lower Tg polymer materials enabling operation above the Tg of the polymer material(s).

Thermo-optic Grating Devices

In practical devices, it is desirable for the device to respond linearly to the application of a control signal. This property is desirable because it simplifies device electronics that control and monitor performance compared to systems that possess a nonlinear response which then require complex algorithms to relate device control signals to device response. In addition, response linearity allows uncomplicated adjustment, tuning, and control of device operation because signal and response are related by a simple derivative relationship and device performance can be predicted if the control signal is known.

Thermo-optic devices operated in the spirit of this invention, comprise materials with Tg below the operating temperature of the device and therefore naturally operate in a regime where the refractive index of the polymer reasonably changes linearly with temperature (see region B of FIG. 1).

In contrast, devices comprised of materials with Tg above the operating temperature will experience a change in the slope of the thermo-optic coefficient as the temperature of the device is raised above Tg. This change in slope produces a nonlinear response of the index of refraction to the applied control signal (temperature). Note that devices operated at temperatures well below Tg (see region A of FIG. 1) also exhibit a linear relationship between refractive index and temperature, but these devices operate with a lower thermo-optic coefficient than devices operating at a temperature above Tg, and they experience the unfavorable viscoelastic effects described above such as long-time constant change in the index of refraction which may unbalance a device or increase its insertion loss.

Figure 15:
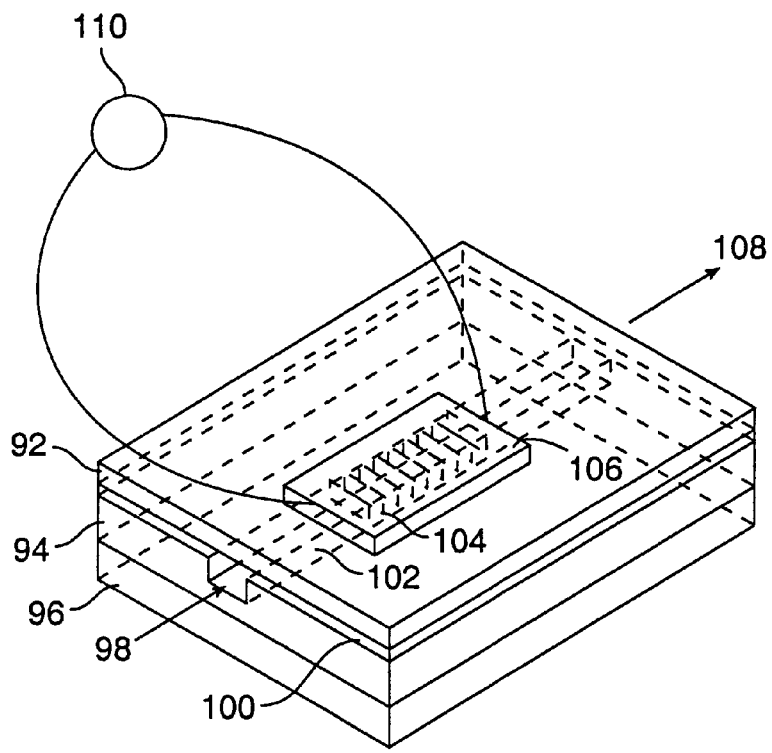
FIG. 15 is a perspective view of a thermo-optic grating device according to the invention.

Elements capable of being regulated to attain a desired temperature or index of refraction include devices such as gratings as shown in FIG. 15. Polymer thermo-optic grating devices may be used as optical filters, add/drop multiplexers, or more generally as thermo-optically tunable Bragg gratings. Desirable properties include long-term stability of index of refraction, a large material thermo-optic coefficient, linearity of response as a finction of temperature, and lack of birefringence. All of these properties are uniquely obtained with optical polymer waveguide materials operated above their Tg, and preferably above their effective Tg.

Consider a Bragg grating formed by fabricating a polymer multi-layer stack consisting of a lower cladding 94, core 100, and upper cladding 92, on a substrate 96. The core layer contains a waveguide (as described earlier) where the optical mode in the waveguide 102 now overlaps a region containing a grating 104. The grating may be fabricated by one of several methods known in the art including etching, ablation, molding, embossing, lamination, e-beam writing, holographic exposure, etc., provided that the process provides adequate modulation of the index of refraction with the desired periodicity. The grating period (typically on the order of the wavelength of light) is selected to achieve Bragg reflection for at least a predetermined wavelength of light 98 propagating in or coupled into the waveguide. Light of wavelength satisfying the Bragg condition is reflected or coupled into another path. In a preferred embodiment, the grating retro-reflects light in the waveguide.

The Bragg waveguide reflector can be made thermally tunable by fabricating a heating electrode 106 on the device in proximity to the grating element. When a control element 110 delivers current to the heating element the temperature of the polymer (grating) in proximity to the heater will change as a result of the thermo-optic effect. The refractive index change of the grating affects the wavelength of light that satisfies the Bragg condition so that a different wavelength is now Bragg reflected in the waveguide. If the process is repeated at another temperature another wavelength will then satisfy the Bragg reflection condition. In this manner the device is tunable because a temperature can be selected to achieve Bragg reflection at many predetermined wavelengths. It should be noted that this device is usually operated in a steady state temperature condition so that a single wavelength will satisfy the Bragg reflection condition over a given time interval. A linear temperature change of the polymer material comprising the grating in this invention then produces a linear response of the resonant wavelength of the grating with respect to temperature, thus providing linear tunability. In addition, grating devices in this invention will have wide resonant wavelength tuning capability (bandwidth) because of enhanced thermo-optic coefficients.

The invention has now been explained with reference to specific embodiments. Other embodiments will be apparent to those of ordinary skill in the art. Therefore it is not intended that the invention be limited, except as indicated by the appended claims, which form part of the invention description.

What is claimed is:

1. A thermo-optic apparatus which is thermally cycled comprising:
   a polymer having a glass transition temperature not exceeding a minimum operating temperature of the polymer along an optical path such that the apparatus functions in a manner allowing polymer chains to retain high local mobility.

2. The apparatus according to claim 1 further including a thermal excitation element thermally coupled to an optical transmission region of the apparatus for controllably effecting a change in refractive index in response to temperature change during a period of interest.

3. The apparatus according to claim 2, wherein said excitation element is a patterned resistive layer.

4. The apparatus according to claim 2 formed as a deflector.

5. The apparatus according to claim 4 wherein said deflector is a total internal reflection switch.

6. The apparatus according to claim 2 formed as a controller capable of regulating to a desired index of refraction.

7. The apparatus according to claim 6 wherein said controller is a grating.

8. The apparatus according to claim 1 wherein said glass transition temperature is at least 20° C. below a minimum operating temperature of said polymer.

9. The apparatus according to claim 1 further including a heating element to maintain a minimum operating temperature.

10. The apparatus according to claim 1 further including a cooling element to regulate the nominal operating temperature.

11. The apparatus according to claim 1 wherein said optical path is an optical waveguide segment.

12. The apparatus according to claim 1 wherein said polymer is a crosslinked polymer.

13. The apparatus according to claim 1 wherein said polymer has an effective glass transition temperature not exceeding a minimum operating temperature of the polymer along an optical path such that the apparatus functions in a manner allowing polymer chains to retain high local mobility.

14. The apparatus according to claim 1, wherein said polymer comprises at least one layer on a substrate.

15. An optical device comprising:
   at least one element of an optically transparent polymer having a glass transition temperature and a temperature dependent excitation threshold for the appearance of viscoelastic effects;
   a thermal exciter disposed proximate said polymer element for actuating said polymer element; and
   a temperature control system for regulating the nominal operating temperature to a range around a design temperature, such that said operating temperature is maintained above said glass transition temperature, in order to exploit viscoelastic effects at temperatures above said glass transition temperature.

16. The optical device according to claim 15 wherein said thermal exciter is operative to change the index of refraction of the optical element.

17. The optical device according to claim 16, wherein said change in index is cyclic.

18. The optical device according to claim 15 further including an optical waveguide optically coupled to said polymer element.

19. The optical device according to claim 15 further including electrodes forming a portion of said thermal exciter.

20. The optical device according to claim 15 wherein said polymer element is disposed in an optical path as an optical switch, said optical switch being responsive to said thermal exciter to change transmissive state.

21. The optical device according to claim 20 wherein said optical switch is a total internal reflection switch.

22. The optical device according to claim 15 wherein said polymer element is disposed in an optical path as a controller capable of regulating to a desired index of refraction.

23. The optical device according to claim 22 wherein said controller is a tunable optical grating responsive to said thermal exciter.

24. The optical device according to claim 15, wherein said glass transition temperature is at least 20° C. below the polymer nominal operating temperature.

25. The optical device according to claim 15 further including a cooling element to regulate the nominal operating temperature.

26. The optical device according to claim 15, wherein the excitation threshold is a threshold of slow change of index of refraction in said polymer, said slow change in index of refraction having a rate of change which is less than a rate of change of thermal excitation applied by said thermal exciter.

27. The optical device according to claim 15, wherein said polymer is a crosslinked polymer.

28. The optical device according to claim 27, wherein the excitation threshold is a threshold of slow change of index of refraction in said crosslinked polymer and wherein said temperature control system is operative to maintain said nominal operating temperature such that the threshold relative to the thermal pulse energy per unit area is substantially greater than the thermal pulse energy per unit applied by said thermal exciter.

29. The optical device according to claim 27, wherein the excitation threshold is a threshold of slow change of index of refraction in said crosslinked polymer and wherein said temperature control system is operative to maintain said nominal operating temperature such that the threshold relative to the thermal power per unit area is substantially greater than the thermal power per unit applied by said thermal exciter.

30. The optical device according to claim 15, wherein said polymer has an effective glass transition temperature, and said temperature control system regulates the nominal operating temperature to a range around said design temperature, such that said operating temperature is maintained above said effective glass transition temperature, in order to exploit viscoelastic effects at temperatures above said effective glass transition temperature.

31. An optical device comprising:
 at least one layer of an optically transparent polymer element characterized by a glass transition temperature below a nominal operating temperature of said optical device;
 an optical waveguide disposed to include said polymer element; and
 a temperature control system for regulating operating temperature such that said operating temperature is maintained above said glass transition temperature in order to exploit at least one property of said polymer at said nominal operating temperature.

32. The optical device according to claim 31 wherein said property is rate of change of index of refraction with temperature.

33. The optical device according to claim 31 wherein said property is reduction of power requirements required to excite said polymer element.

34. The optical device according to claim 33 wherein said property is reduction of thermal energy requirements required to excite said polymer element.

35. The optical device according to claim 31 wherein said property is fidelity of reproduction of a predicted response with minimum distortion, wherein said predicted response is in form of rate of change of index of refraction vs. time.

36. The optical device according to claim 31 wherein said property is minimized generation of additional frequency components of an output signal relative to a predicted signal, said output signal being a rate of change of index of refraction vs. time.

37. The optical device according to claim 31 wherein said property is reduced optical insertion loss of said element.

38. The optical device according to claim 31 wherein said property is increased lifetime including tolerance for thermal cycling.

39. The optical device according to claim 31 wherein said property is low residual stress associated with fabrication.

40. The optical device according to claim 31 wherein said property is low birefringence.

41. The optical device according to claim 31 wherein said property is the essentially constant rate of change of index of refraction as a function of temperature.

42. The optical device according to claim 31 wherein said device is an optical grating.

43. The optical device according to claim 42 wherein said property is the linear relationship between the resonant wavelength of said grating with respect to temperature.

44. The optical device according to claim 31 formed as an optical switch.

45. The optical device according to claim 31 further including an applicator electrode for thermally exciting a change of index of refraction of said element.

46. The optical device according to claim 31 wherein said polymer is a crosslinked polymer.

47. The optical device according to claim 46 wherein said property is reduced long-term physical deformation of said element.

48. The optical device according to claim 46 wherein said property is low residual stress associated with thermal cycling.

49. The optical device according to claim 31 wherein said polymer is a polyacrylate.

50. The optical device according to claim 15 wherein said polymer is a polyacrylate.

51. The optical device according to claim 1 wherein said polymer is a polyacrylate.

52. The optical device according to claim 31 wherein said polymer is a polyurethane.

53. The optical device according to claim 15 wherein said polymer is a polyurethane.

54. The optical device according to claim 1 wherein said polymer is a polyurethane.

55. An integrated optical switch comprising:
 a substrate;
 a waveguide disposed on the substrate, the waveguide having an output;

a polymeric element disposed on the substrate proximate to the output of the waveguide to optically couple to the waveguide, the polymeric element being optically transmissive and having a selected glass transition temperature; and a heating element thermally coupled to the polymeric element to maintain an operating temperature of the polymeric element above the selected glass transition temperature.

56. The integrated optical switch according to claim 55 wherein said heating element is configured to further provide transient thermal energy to said polymeric element to alter an optical characteristic of said polymeric element and actuate said integrated optical switch.

57. The integrated optical switch according to claim 55 further comprising a second heating element thermally coupled to said polymeric element to provide transient thermal energy to said polymeric element to alter an optical characteristic of said polymeric element and actuate said integrated optical switch.

58. An optical device comprising:

an input waveguide coupled to an input of the optical device, the input waveguide having a transmission axis;

a first output waveguide optically coupled to the input waveguide and forming a first angle of separation with the transmission axis of the input waveguide, the first output waveguide including a section of polymer material having a selected glass transition temperature;

a second output waveguide optically coupled to the input waveguide and forming a second angle of separation with the transmission axis of the input waveguide so that light transmitted by the input waveguide is capable of being split between the first output waveguide and the second output waveguide; and a heater, thermally coupled to at least the first output waveguide, to maintain an operating temperature of the polymer material above the selected glass transition temperature.

59. The optical device according to claim 58 wherein the second output waveguide includes a second section of polymeric material having a second selected glass transition temperature and further comprising a second heater thermally coupled to the second output waveguide.

60. The optical device according to claim 58 wherein said first angle of separation is zero degrees and said first output waveguide is a continuation of said input waveguide.

61. A Total Internal Reflective (TIR) optical switch comprising:

a core of a first optical material, said core forming a primary waveguide;

at least one cladding layer of a second optical material, said cladding layer disposed adjacent said core and having a lower index of refraction than said core;

at least one of said first and second optical materials being an optically transmissive crosslinked polymer having a glass transition temperature;

a patterned resistive primary heating element disposed upon said cladding layer and bridging said primary waveguide such that an edge of the electrode is at an oblique angle to said waveguide, said electrode, when activated, being for effecting a change of the index of refraction of said polymer for redirecting optical energy from said primary waveguide, said element being coupleable to a controlling exciter, said optical switch being for operation in an environment at a temperature above said glass transition temperature.

62. The TIR optical switch according to claim 61 further including a secondary heating element for maintaining said environment at a temperature above said first and second glass transition temperature.

63. The TIR optical switch according to claim 61 wherein said primary heating element is additionally operative to maintain said environment at a temperature above said first and second glass transition temperature.

64. A method for operating an optical device comprising an optical structure fabricated from an optically transmissive polymer material characterized by a glass transition temperature and a temperature dependent threshold for appearance of viscoelastic effects, said method comprising:

maintaining an operating temperature above the glass transition temperature; while directing optical energy into said polymer element; while selectively applying thermal energy to said polymer element to selectively control the transport of said optical energy.

65. The method according to claim 64 wherein said selectively applying step comprises:

selectively applying impulses of thermal energy to a selected region of said polymer element to effect a localized change of index of refraction at a controlled rate of change.

66. The method according to claim 65 further including the step of thereafter:

allowing said index of refraction to substantially revert; and thereafter selectively reapplying thermal energy to said polymer element to re-effect a change of index of refraction at a controlled rate of change.

67. The method according to claim 66 further including, after applying said thermal energy, actively extracting heat from said polymer element.

68. A method for using a polymer material comprising:

establishing a minimum operating temperature above a characteristic glass transition temperature of the polymer; thereafter;

transiently thermally exciting the polymer above the minimum operating temperature while directing electromagnetic energy into the polymer to effect a change of the index of refraction of the polymer in order to control the transport of the electromagnetic energy.

69. A method for operating an optical switch having a core of optically transmissive crosslinked polymer having a first glass transition temperature, at least one cladding layer of optically transmissive crosslinked polymer having a second glass transition temperature, and an applicator electrode for effecting a change of the index of refraction of said polymer, said applicator electrode being coupled to an exciter, said optical switch being for operation in an environment at a temperature above said second glass transition temperatures, said method comprising:

maintaining an operating temperature above the glass transition temperature; while directing optical energy into said core; while selectively applying thermal energy to a region of said core through said applicator electrode to change index of refraction in said region in order to selectively redirect said optical energy.

70. A method for operating an optical switch having a core of optically transmissive crosslinked polymer having a first glass transition temperature, at least one cladding layer of optically transmissive crosslinked polymer having a second glass transition temperature, and an applicator electrode for effecting a change of the index of refraction of said polymer, said applicator electrode being coupleable to an exciter, said optical switch being for operation in an environment at a temperature above said first and second glass transition temperatures, said method comprising: maintaining an operating temperature above the glass transition temperature; while directing optical energy into said core; while selectively applying thermal energy to a region of said core through said applicator electrode to change index of refraction in said region in order to selectively redirect said optical energy.

* * * * *

UNITED STATES PATENT AND TRADEMARK OFFICE
CERTIFICATE OF CORRECTION

PATENT NO. : 6,236,774 B1  Page 1 of 1
DATED : May 22, 2001
INVENTOR(S) : Lackritz et al.

It is certified that error appears in the above-identified patent and that said Letters Patent is hereby corrected as shown below:

Column 1,
Line 10, insert the following text after "Command":
-- and contract no. N61331-96-C-0036 awarded by the Naval Surface Warfare Center --

Signed and Sealed this

Fourth Day of June, 2002

*Attest:*

JAMES E. ROGAN
*Attesting Officer*  *Director of the United States Patent and Trademark Office*